United States Patent
Tian et al.

(10) Patent No.: US 10,128,677 B2
(45) Date of Patent: Nov. 13, 2018

(54) QUICK CHARGING METHOD, MOBILE TERMINAL, AND POWER ADAPTER

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/411,248

(22) Filed: Jan. 20, 2017

(65) Prior Publication Data
US 2017/0194799 A1    Jul. 6, 2017

Related U.S. Application Data

(63) Continuation of application No. PCT/CN2016/070203, filed on Jan. 5, 2016.

(51) Int. Cl.
| | |
|---|---|
| *H04B 1/38* | (2015.01) |
| *H02J 7/00* | (2006.01) |
| *H02J 7/04* | (2006.01) |
| *H04M 19/08* | (2006.01) |
| *H04W 88/02* | (2009.01) |

(52) U.S. Cl.
CPC ............ *H02J 7/007* (2013.01); *H02J 7/0036* (2013.01); *H02J 7/0045* (2013.01); *H02J 7/041* (2013.01); *H04M 19/08* (2013.01); *H02J 2007/0001* (2013.01); *H02J 2007/0062* (2013.01); *H02J 2007/0096* (2013.01); *H04W 88/02* (2013.01)

(58) Field of Classification Search
CPC ........ H02J 7/007; H02J 7/0036; H02J 7/0045; H02J 2007/0001; H02J 2007/0096; H04W 88/02
USPC .......................................................... 455/573
See application file for complete search history.

(56) References Cited

U.S. PATENT DOCUMENTS

| | | | |
|---|---|---|---|
| 9,148,001 B1 * | 9/2015 | Mohanty | .................. H02G 3/00 |
| 2008/0191667 A1 * | 8/2008 | Kernahan | ............. H01M 10/44 |
| | | | 320/150 |

(Continued)

FOREIGN PATENT DOCUMENTS

| | | |
|---|---|---|
| CN | 102957193 A | 3/2013 |
| CN | 104269583 A | 1/2015 |

(Continued)

OTHER PUBLICATIONS

International Search Report issued for PCT/CN2016/070203 mailed date unknown. (5 pages).

(Continued)

*Primary Examiner* — Nay A Maung
*Assistant Examiner* — Angelica M Perez
(74) *Attorney, Agent, or Firm* — Young Basile Hanlon & MacFarlane, P.C.

(57) ABSTRACT

In embodiments of the present disclosure, after a mobile terminal has recognized a type of a power adapter, the mobile terminal actively initiates a quick charging request, and negotiates with the power adapter via handshake communication to determine charging parameters. The power adapter charges a battery of the mobile terminal via a multi-stage constant current mode.

21 Claims, 5 Drawing Sheets

(56) References Cited

U.S. PATENT DOCUMENTS

| | | | |
|---|---|---|---|
| 2011/0187314 A1 | 8/2011 | Kim | |
| 2015/0130417 A1* | 5/2015 | Song | H02J 7/0052 |
| | | | 320/112 |
| 2015/0180244 A1* | 6/2015 | Jung | H02J 7/0055 |
| | | | 320/107 |
| 2017/0093189 A1* | 3/2017 | Zeng | H02J 7/0044 |
| 2017/0133862 A1* | 5/2017 | Jung | H01M 10/4257 |

FOREIGN PATENT DOCUMENTS

| | | |
|---|---|---|
| CN | 104701937 A | 6/2015 |
| CN | 104967199 A | 10/2015 |
| CN | 107040022 A | 8/2017 |
| WO | 2014077978 A1 | 5/2014 |

OTHER PUBLICATIONS

Extended European Search Report issued in corresponding European application No. 16818965.2 dated Jan. 15, 2018.

* cited by examiner

US 10,128,677 B2

QUICK CHARGING METHOD, MOBILE TERMINAL, AND POWER ADAPTER

CROSS REFERENCE TO RELATED APPLICATIONS

This application is a continuation application of PCT Patent Application No. PCT/CN2016/070203, entitled "QUICK CHARGING METHOD, MOBILE TERMINAL, AND POWER ADAPTER", filed on Jan. 5, 2016, the content of which is hereby incorporated in its entireties by reference.

TECHNICAL FIELD

Embodiments of the present disclosure relates to charging field, and more particularly to a quick charging method, a mobile terminal, and a power adapter.

BACKGROUND

Mobile terminals (e.g., smart phones) become more and more popular with consumers. However, the power consumption of mobile terminals is great, thus mobile terminals need to be charged regularly. As the battery capacity of mobile terminals becomes greater and greater, correspondingly, the charging time becomes longer. How to realize quick charging is a problem that may be needed to be solved.

In order to achieve the purpose of quick charging, the output current of a power adapter may be directly increased without consideration of endurance of a mobile terminal, as such, a phenomenon of the heating and even burnout of the mobile terminal may occur, which may reduce the lifespan of the mobile terminal.

SUMMARY

In the present disclosure, a quick charging method, a power adapter, and a mobile terminal are provided, which can improve the charging process.

In a first aspect, a quick charging method is provided. The method may be applied in a mobile terminal. The mobile terminal may be coupled to a power adapter via a universal serial bus (USB) interface. Power lines of the USB interface may be used for charging a battery of the mobile terminal, data lines of the USB interface are used for communication between the mobile terminal and the power adapter. The mobile terminal may support a normal charging mode and a quick charging mode, and a charging speed of the quick charging mode is greater than that of the normal charging mode.

The method may include: determining, by the mobile terminal, a type of the power adapter when it is detected that the power adapter is coupled to the mobile terminal; activating, by the mobile terminal, a quick charging communication process between the mobile terminal and the power adapter when it is determined that the power adapter is a non-USB power adapter, and transmitting, by the mobile terminal, a first instruction to the power adapter, where the first instruction requests the power adapter to charge the battery in the quick charging mode; communicating, by the mobile terminal, with the power adapter to determine a charging voltage of the quick charging mode.

The method may further include: communicating, by the mobile terminal, with the power adapter to determine a charging current of the quick charging mode; and communicating, by the mobile terminal, with the power adapter to constantly transmit information of a voltage of the battery to the power adapter when the power adapter adjusts an output voltage and output current of the power adapter to be the charging voltage and the charging current of the quick charging mode respectively and enters a constant current phase, so as to cause the power adapter to adjust the output current according to the voltage of the battery, and charge the battery in a multi-stage constant current mode.

In a second aspect, a quick charging method is provided. The method may be applied in a power adapter. The power adapter may be coupled to a mobile terminal via a USB interface, power lines of the USB interface may be used for the power adapter to charge a battery of the mobile terminal, and data lines of the USB interface may be used for communication between the power adapter and the mobile terminal. The power adapter may support a normal charging mode and a quick charging mode, and a charging speed of the quick charging mode is greater than that of the normal charging mode.

The method may include receiving, by the power adapter, a first instruction from the mobile terminal when the mobile terminal determines that the power adapter is a non-USB power adapter, and activates a quick charging communication process between the mobile terminal and the power adapter, where the first instruction requests the power adapter to charge the battery in the quick charging mode; communicating, by the power adapter, with the mobile terminal to determine a charging voltage of the quick charging mode.

The method may also include: communicating, by the power adapter, with the mobile terminal to determine a charging current of the quick charging mode; adjusting, by the power adapter, an output voltage and output current of the power adapter to be the charging voltage and the charging current of the quick charging mode respectively to enter a constant current phase; communicating, by the power adapter, with the mobile terminal during the constant current phase to constantly receive information of a voltage of the battery from the mobile terminal; and adjusting, by the power adapter, the output current according to the voltage of the battery, so as to charge the battery in a multi-stage constant current mode.

In a third aspect, a mobile terminal is provided. The mobile terminal may be coupled to a power adapter via a universal serial bus (USB) interface, power lines of the USB interface may be used for charging a battery of the mobile terminal, and data lines of the USB interface may be used for communication between the mobile terminal and the power adapter. The mobile terminal may support a normal charging mode and a quick charging mode, and a charging speed of the quick charging mode is greater than that of the normal charging mode.

The mobile terminal may include: a charging circuit, and a communication control circuit configured to determine a type of the power adapter when it is detected that the power adapter is coupled to the mobile terminal, activate a quick charging communication process between the mobile terminal and the power adapter when it is determined that the power adapter is a non-USB power adapter, and transmit a first instruction to the power adapter, wherein the first instruction requests the power adapter to charge the battery in the quick charging mode.

The communication control circuit may be further configured to communicate with the power adapter to determine a charging voltage of the quick charging mode, communicate with the power adapter to determine a charging current of the quick charging mode, and communicate with the power adapter to constantly transmit information of a voltage of the battery to the power adapter when the power adapter adjusts an output voltage and output current of the power adapter to be the charging voltage and the charging current of the quick charging mode respectively and enters a constant current phase, so as to cause the power adapter to adjust the output current according to the voltage of the battery, and charge the battery in a multi-stage constant current mode via the charging circuit.

In a fourth aspect, a power adapter is provided. The power adapter may be coupled to a mobile terminal via a USB interface, power lines of the USB interface may be used for the power adapter to charge a battery of the mobile terminal, and data lines of the USB interface may be used for communication between the power adapter and the mobile terminal. The power adapter may support a normal charging mode and a quick charging mode, and a charging speed of the quick charging mode is greater than that of the normal charging mode.

The power adapter may include: a charging circuit, and a communication control circuit configured to receive a first instruction from the mobile terminal when the mobile terminal determines that the power adapter is a non-USB power adapter, and activates a quick charging communication process between the mobile terminal and the power adapter, wherein the first instruction requests the power adapter to charge the battery in the quick charging mode.

The communication control circuit may be further configured to communicate with the mobile terminal to determine a charging voltage of the quick charging mode, communicate with the mobile terminal to determine a charging current of the quick charging mode, adjust an output voltage and output current of the power adapter to be the charging voltage and the charging current of the quick charging mode respectively to enter a constant current phase, communicate with the mobile terminal during the constant current phase to constantly receive information of a voltage of the battery from the mobile terminal, and adjust the output current according to the voltage of the battery, so as to charge the battery in a multi-stage constant current mode via the charging circuit.

In the technical solution of the present disclosure, the power adapter does not increase the charging current blindly for quick charging, but negotiates with the mobile terminal via communication with the mobile terminal to determine whether the quick charging mode can be adopted. The security of the quick charging process is improved.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

Figure 1:
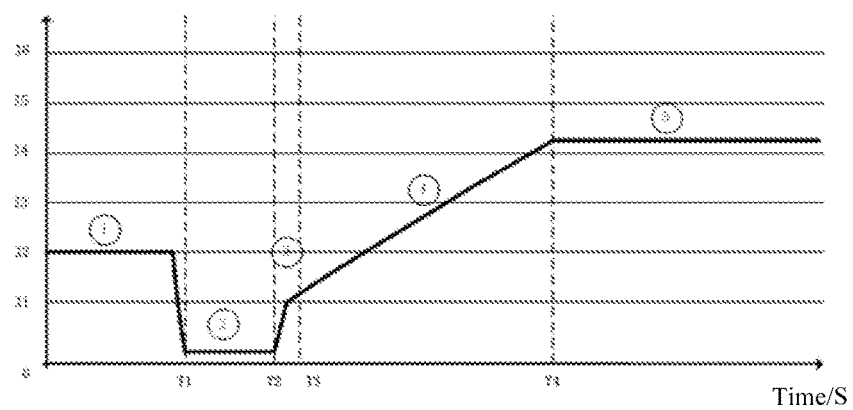
FIG. 1 is a schematic diagram of a quick charging process in accordance with an embodiment of the present disclosure.

In combination with the first aspect, in an implementation manner of the first aspect, the first instruction further indicates path impedance of the mobile terminal, the path impedance of the mobile terminal is configured for the power adapter to determine whether the USB interface is in good contact, or whether impedance of a charge circuit between the power adapter and the mobile terminal is abnormal.

In combination with the first aspect or any of the above implementation manners, in another implementation manner of the first aspect, a format of the first instruction is 101000YYYYY0, Y indicates 1 bit, and the path impedance of the mobile terminal equals to YYYYY*5 m$\Omega$.

In combination with the first aspect or any of the above implementation manners, in another implementation manner of the first aspect, the method further comprises: receiving, by the mobile terminal, a reply instruction of the first instruction from the power adapter, wherein the reply instruction of the first instruction indicates that the power adapter supports the quick charging mode, or indicates that the power adapter agrees to charge the battery in the quick charging mode.

In combination with the first aspect or any of the above implementation manners, in another implementation manner of the first aspect, a format of the reply instruction of the first instruction is 101XX, X indicates 1 bit, XX=01 indicates that the power adapter has received the first instruction, and when XX is any value except 01, it indicates that the communication between the mobile terminal and the power adapter becomes abnormal.

In combination with the first aspect or any of the above implementation manners, in another implementation manner of the first aspect, communicating, by the mobile terminal, with the power adapter to determine the charging voltage of the quick charging mode comprises: transmitting, by the mobile terminal, a second instruction to the power adapter, wherein the second instruction indicates that the output voltage of the power adapter is high, low, or proper; and receiving, by the mobile terminal, a reply instruction of the second instruction from the power adapter, wherein the reply instruction of the second instruction indicates that the power adapter has received the second instruction.

Optionally, the second instruction can indicate a current voltage of the battery, so as to cause the power adapter to directly determine the output voltage according to the current voltage of the battery.

In combination with the first aspect or any of the above implementation manners, in another implementation manner of the first aspect, a format of the second instruction is 101001000YY0, Y indicates 1 bit, YY=11 indicates that the output voltage of the power adapter is proper, YY=10 indicates that the output voltage of the power adapter is high, YY=01 indicates that the output voltage of the power adapter is low, and YY=00 indicates that the communication between the mobile terminal and the power adapter becomes abnormal.

In combination with the first aspect or any of the above implementation manners, in another implementation manner of the first aspect, a format of the reply instruction of the second instruction is 101XX, X indicates 1 bit, XX=01 indicates that the power adapter has received the second instruction, and when XX is any value except 01, it indicates that the communication between the mobile terminal and the power adapter becomes abnormal.

In combination with the first aspect or any of the above implementation manners, in another implementation manner of the first aspect, communicating, by the mobile terminal, with the power adapter to determine the charging current of the quick charging mode comprises: transmitting, by the mobile terminal, a third instruction to the power adapter, wherein the third instruction indicates a maximum charging current currently supported by the mobile terminal; and receiving, by the mobile terminal, a reply instruction of the third instruction from the power adapter, wherein the reply instruction of the third instruction indicates that the power adapter has received the third instruction, or the third instruction indicates that the mobile terminal is ready to enter the constant current phase.

In combination with the first aspect or any of the above implementation manners, in another implementation manner of the first aspect, a format of the third instruction is 101010YYY000, Y indicates 1 bit, and the maximum charging current currently supported by the mobile terminal equals to 3000+(YYY*250) mA.

In combination with the first aspect or any of the above implementation manners, in another implementation manner of the first aspect, a format of the reply instruction of the third instruction is 101XX, X indicates 1 bit, XX=01 indicates that the power adapter has received the third instruction, and when XX is any value except 01, it indicates that the communication between the mobile terminal and the power adapter becomes abnormal.

In combination with the first aspect or any of the above implementation manners, in another implementation manner of the first aspect, communicating, by the mobile terminal, with the power adapter to constantly transmit the information of the voltage of the battery to the power adapter comprises: transmitting, by the mobile terminal, a fourth instruction to the power adapter, wherein the fourth instruction indicates the voltage of the battery; and receiving, by the mobile terminal, a reply instruction of the fourth instruction from the power adapter, wherein the reply instruction of the fourth instruction indicates that the power adapter has received the fourth instruction.

In combination with the first aspect or any of the above implementation manners, in another implementation manner of the first aspect, a format of the fourth instruction is 101011YYYYYY, Y indicates 1 bit, and the voltage of the battery equals 3404+(YYYYYY*16) mV.

In combination with the first aspect or any of the above implementation manners, in another implementation manner of the first aspect, the reply instruction of the fourth instruction further indicates that the USB interface is in bad contact, or indicates that the impedance of the charge circuit between the power adapter and the mobile terminal is abnormal, and is ready to exit the quick charging mode, or indicates that the quick charging communication process needs to be reactivated.

In combination with the first aspect or any of the above implementation manners, in another implementation manner of the first aspect, a format of the reply instruction of the fourth instruction is 101XX, X indicates 1 bit, XX=01 indicates that the power adapter has received the fourth instruction, XX=11 indicates that the USB interface is in bad contact, or indicates that the impedance of the charge circuit between the power adapter and the mobile terminal is abnormal, and is ready to exit the quick charging mode, or indicates that the quick charging communication process needs to be reactivated, and when XX is any value except 01 and 11, it indicates that the communication between mobile terminal and the power adapter becomes abnormal.

In combination with the first aspect or any of the above implementation manners, in another implementation manner of the first aspect, the method further comprises: transmitting, by the mobile terminal, a fifth instruction to the power adapter, wherein the fifth instruction indicates a maximum voltage of the battery; and receiving, by the mobile terminal, a reply instruction of the fifth instruction from the power adapter, wherein the reply instruction of the fifth instruction indicates that the power adapter has received the fifth instruction.

In combination with the first aspect or any of the above implementation manners, in another implementation manner of the first aspect, a format of the fifth instruction is 101100YYYYYY, Y indicates 1 bit, and the maximum voltage of the battery is 4100+YYYYYY*10 mV.

In combination with the first aspect or any of the above implementation manners, in another implementation manner of the first aspect, a format of the reply instruction of the fifth instruction is 101XX, X indicates 1 bit, XX=01 indicates that the power adapter has received the fifth instruction, and when XX is any value except 01, it indicates that the communication between the mobile terminal and the power adapter becomes abnormal.

In combination with the first aspect or any of the above implementation manners, in another implementation manner of the first aspect, the method further comprises: executing, by the mobile terminal, at least one of following operations when the communication between the power adapter and the mobile terminal becomes abnormal, wherein the following operations comprise: exiting the quick charging mode, charging the battery in the normal charging mode, stopping charging, or reactivating the quick charging communication process.

In combination with the first aspect or any of the above implementation manners, in another implementation manner of the first aspect, an instruction transmitted from the mobile terminal to the power adapter comprises multiple bits, when the mobile terminal transmits any instruction, the mobile terminal firstly transmits a most significant bit (MSB) of the multiple bits of the any instruction; or an instruction received from the power adapter by the mobile terminal comprises multiple bits, when the mobile terminal receives an instruction, the mobile terminal firstly receives a MSB of the multiple bits of the instruction.

In combination with the first aspect or any of the above implementation manners, in another implementation manner of the first aspect, clock signals used in the communication between the power adapter and the mobile terminal are provided by the power adapter.

In combination with the first aspect or any of the above implementation manners, in another implementation manner of the first aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the first aspect or any of the above implementation manners, in another implementation manner of the first aspect, each instruction received from the mobile terminal by the power adapter comprises a 12-bit data, the power adapter receives the 12-bit data from the mobile terminal via twelve continuous clock periods of the clock signal, level of previous 500 μs of each of the twelve continuous clock periods is high, and level of latter 10 μs of each of the twelve continuous clock periods is low; or each instruction transmitted from the power adapter to the mobile terminal comprises a 5-bit data, the power adapter transmits the 5-bit data to the mobile terminal via five continuous clock periods of the clock signal, level of previous 10 μs of each of the five continuous clock periods is low, and level of latter 500 μs of each of the five continuous clock periods is high.

In combination with the first aspect or any of the above implementation manners, in another implementation manner of the first aspect, during a process that the power adapter receives an instruction from the mobile terminal, a minimum value of high level of the clock signal used between the power adapter and the mobile terminal equals to VDD of the power adapter minus 0.7V; or during the process that the power adapter receives an instruction from the mobile terminal, a maximum value of low level of the clock signal used between the power adapter and the mobile terminal is 0.8V; or during a process that the power adapter transmits an instruction to the mobile terminal, a minimum value of high level of the clock signal used between the power adapter and the mobile terminal equals to 0.25VDD+0.8V; or during the process that the power adapter transmits an instruction to the mobile terminal, a maximum value of the high level of the clock signal used between the power adapter and the mobile terminal is 4.5V; or during the process that the power adapter transmits an instruction to the mobile terminal, a maximum value of low level of the clock signal used between the power adapter and the mobile terminal is 0.15VDD. The VDD is a work voltage of the power adapter, and/or the VDD is greater than 3.2V and less than 4.5V.

In combination with the second aspect, in an implementation manner of the second aspect, the first instruction further indicates path impedance of the mobile terminal, the path impedance of the mobile terminal is configured for the power adapter to determine whether the USB interface is in good contact, or to determine whether impedance of a charge circuit between the power adapter and the mobile terminal is abnormal.

In combination with the second aspect or any of the above implementation manners, in another implementation manner of the second aspect, a format of the first instruction is 101000YYYYY0, Y indicates 1 bit, and the path impedance of the mobile terminal equals to YYYYY*5 mΩ.

In combination with the second aspect or any of the above implementation manners, in another implementation manner of the second aspect, the method further comprises: transmitting, by the power adapter, a reply instruction of the first instruction to the mobile terminal, wherein the reply instruction of the first instruction indicates that the power adapter supports the quick charging mode, or indicates that the power adapter agrees to charge the battery in the quick charging mode.

In combination with the second aspect or any of the above implementation manners, in another implementation manner of the second aspect, a format of the reply instruction of the first instruction is 101XX, X indicates 1 bit, XX=01 indicates that the power adapter has received the first instruction, and when XX is any value except 01, it indicates that the communication between the mobile terminal and the power adapter becomes abnormal.

In combination with the second aspect or any of the above implementation manners, in another implementation manner of the second aspect, communicating, by the power adapter, with the mobile terminal to determine the charging voltage of the quick charging mode comprises: receiving, by the power adapter, a second instruction from the mobile terminal, wherein the second instruction indicates that the output voltage of the power adapter is high, low, or proper; and transmitting, by the power adapter, a reply instruction of the second instruction to the mobile terminal, wherein the reply instruction of the second instruction indicates that the power adapter has received the second instruction.

In combination with the second aspect or any of the above implementation manners, in another implementation manner of the second aspect, a format of the second instruction is 101001000YY0, Y indicates 1 bit, YY=11 indicates that the output voltage of the power adapter is proper, YY=10 indicates that the output voltage of the power adapter is high, YY=01 indicates that the output voltage of the power adapter is low, and YY=00 indicates that the communication between the mobile terminal and the power adapter becomes abnormal.

In combination with the second aspect or any of the above implementation manners, in another implementation manner of the second aspect, a format of the reply instruction of the second instruction is 101XX, X indicates 1 bit, XX=01 indicates that the power adapter has received the second instruction, and when XX is any value except 01, it indicates that the communication between the mobile terminal and the power adapter becomes abnormal.

In combination with the second aspect or any of the above implementation manners, in another implementation manner of the second aspect, communicating, by the power adapter, with the mobile terminal to determine the charging current of the quick charging mode comprises: receiving, by the power adapter, a third instruction from the mobile terminal, wherein the third instruction indicates a maximum charging current currently supported by the mobile terminal; and transmitting, by the power adapter, a reply instruction of the third instruction to the mobile terminal, wherein the reply instruction of the third instruction indicates that the power adapter has received the third instruction, or the third instruction indicates that the mobile terminal is ready to enter the constant current phase.

In combination with the second aspect or any of the above implementation manners, in another implementation manner of the second aspect, a format of the third instruction is 101010YYY000, Y indicates 1 bit, and the maximum charging current currently supported by the mobile terminal equals to 3000+(YYY*250) mA.

In combination with the second aspect or any of the above implementation manners, in another implementation manner of the second aspect, a format of the reply instruction of the third instruction is 101XX, X indicates 1 bit, XX=01 indicates that the power adapter has received the third instruction, and when XX is any value except 01, it indicates that the communication between the mobile terminal and the power adapter becomes abnormal.

In combination with the second aspect or any of the above implementation manners, in another implementation manner of the second aspect, communicating, by the power adapter, with the mobile terminal to constantly receive the information of the voltage of the battery from the mobile terminal comprises: receiving, by the power adapter, a fourth instruction from the mobile terminal, wherein the fourth instruction indicates the voltage of the battery; and transmitting, by the power adapter, a reply instruction of the fourth instruction to the mobile terminal, wherein the reply instruction of the fourth instruction indicates that the power adapter has received the fourth instruction.

In combination with the second aspect or any of the above implementation manners, in another implementation manner of the second aspect, a format of the fourth instruction is 101011YYYYYY, Y indicates 1 bit, and the voltage of the battery equals 3404+(YYYYYY*16) mV.

In combination with the second aspect or any of the above implementation manners, in another implementation manner of the second aspect, the reply instruction of the fourth instruction further indicates that the USB interface is in bad contact, or indicates that the impedance of the charge circuit between the power adapter and the mobile terminal is abnormal, and is ready to exit the quick charging mode, or indicates that the quick charging communication process needs to be reactivated.

In combination with the second aspect or any of the above implementation manners, in another implementation manner of the second aspect, a format of the reply instruction of the fourth instruction is 101XX, X indicates 1 bit, XX=01 indicates that the power adapter has received the fourth instruction, XX=11 indicates that the USB interface is in bad contact, or indicates that the impedance of the charge circuit between the power adapter and the mobile terminal is abnormal, and is ready to exit the quick charging mode, or indicates that the quick charging communication process needs to be reactivated, and when XX is any value except 01 and 11, it indicates that the communication between mobile terminal and the power adapter becomes abnormal.

In combination with the second aspect or any of the above implementation manners, in another implementation manner of the second aspect, the method further comprises: receiving, by the power adapter, a fifth instruction from the mobile terminal, wherein the fifth instruction indicates a maximum voltage of the battery; and transmitting, by the power adapter, a reply instruction of the fifth instruction to the mobile terminal, wherein the reply instruction of the fifth instruction indicates that the power adapter has received the fifth instruction.

In combination with the second aspect or any of the above implementation manners, in another implementation manner of the second aspect, a format of the fifth instruction is 101100YYYYYY, Y indicates 1 bit, and the maximum voltage of the battery is 4100+YYYYYY*10 mV.

In combination with the second aspect or any of the above implementation manners, in another implementation manner of the second aspect, a format of the reply instruction of the fifth instruction is 101XX, X indicates 1 bit, XX=01 indicates that the power adapter has received the fifth instruction, and when XX is any value except 01, it indicates that the communication between the mobile terminal and the power adapter becomes abnormal.

In combination with the second aspect or any of the above implementation manners, in another implementation manner of the second aspect, the method further comprises: executing, by the power adapter, at least one of following operations when the communication between the power adapter and the mobile terminal becomes abnormal, wherein the following operations comprise: exiting the quick charging mode, charging the battery in the normal charging mode, stopping charging, or reactivating the quick charging communication process.

In combination with the second aspect or any of the above implementation manners, in another implementation manner of the second aspect, an instruction received from the mobile terminal by the power adapter comprises multiple bits, when the power adapter receives any instruction, the power adapter firstly receives a MSB of the multiple bits of the any instruction; or an instruction transmitted from the power adapter to the mobile terminal comprises multiple bits, when the power adapter transmits an instruction, the power adapter firstly transmits a MSB of the multiple bits of the instruction.

In combination with the second aspect or any of the above implementation manners, in another implementation manner of the second aspect, clock signals used in the communication between the power adapter and the mobile terminal are provided by the power adapter.

In combination with the second aspect or any of the above implementation manners, in another implementation manner of the second aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the second aspect or any of the above implementation manners, in another implementation manner of the second aspect, each instruction received from the mobile terminal by the power adapter comprises a 12-bit data, the power adapter receives the 12-bit data from the mobile terminal via twelve continuous clock periods of the clock signal, level of previous 500 μs of each of the twelve continuous clock periods is high, and level of latter 10 μs of each of the twelve continuous clock periods is low; or each reply instruction transmitted from the power adapter to the mobile terminal comprises a 5-bit data, the power adapter transmits the 5-bit data to the mobile terminal via five continuous clock periods of the clock signal, level of previous 10 μs of each of the five continuous clock periods is low, and level of latter 500 μs of each of the five continuous clock periods is high.

In combination with the second aspect or any of the above implementation manners, in another implementation manner of the second aspect, during a process that the power adapter receives an instruction from the mobile terminal, a minimum value of high level of the clock signal used between the power adapter and the mobile terminal equals to VDD of the power adapter minus 0.7V; or during the process that the power adapter receives an instruction from the mobile terminal, a maximum value of low level of the clock signal used between the power adapter and the mobile terminal is 0.8V; or during a process that the power adapter transmits an instruction to the mobile terminal, a minimum value of high level of the clock signal used between the power adapter and the mobile terminal equals to 0.25VDD+0.8V; or during the process that the power adapter transmits an instruction to the mobile terminal, a maximum value of the high level of the clock signal used between the power adapter and the mobile terminal is 4.5V; or during the process that the power adapter transmits an instruction to the mobile terminal, a maximum value of low level of the clock signal is 0.15VDD. The VDD is a work voltage of the power adapter, and/or the VDD is greater than 3.2V and less than 4.5V.

In combination with the third aspect, in an implementation manner of the third aspect, the first instruction further indicates path impedance of the mobile terminal, the path impedance of the mobile terminal is configured for the power adapter to determine whether the USB interface is in good contact, or to determine whether impedance of a charge circuit between the power adapter and the mobile terminal is abnormal.

In combination with the third aspect or any of the above implementation manners, in another implementation manner of the third aspect, a format of the first instruction is 101000YYYYY0, Y indicates 1 bit, and the path impedance of the mobile terminal equals to YYYYY*5 mΩ.

In combination with the third aspect or any of the above implementation manners, in another implementation manner of the third aspect, the communication control circuit is further configured to receive a reply instruction of the first instruction from the power adapter, and the reply instruction of the first instruction indicates that the power adapter supports the quick charging mode, or indicates that the power adapter agrees to charge the battery in the quick charging mode.

In combination with the third aspect or any of the above implementation manners, in another implementation manner of the third aspect, a format of the reply instruction of the first instruction is 101XX, X indicates 1 bit, XX=01 indicates that the power adapter has received the first instruction, and when XX is any value except 01, it indicates that the communication between the mobile terminal and the power adapter becomes abnormal.

In combination with the third aspect or any of the above implementation manners, in another implementation manner of the third aspect, the communication control circuit is configured to transmit a second instruction to the power adapter, and the second instruction indicates that the output voltage of the power adapter is high, low, or proper. The communication control circuit is configured to receive a reply instruction of the second instruction, and the reply instruction of the second instruction indicates that the power adapter has received the second instruction.

In combination with the third aspect or any of the above implementation manners, in another implementation manner of the third aspect, a format of the second instruction is 101001000YY0, Y indicates 1 bit, YY=11 indicates that the output voltage of the power adapter is proper, YY=10 indicates that the output voltage of the power adapter is high, YY=01 indicates that the output voltage of the power adapter is low, and YY=00 indicates that the communication between the mobile terminal and the power adapter becomes abnormal.

In combination with the third aspect or any of the above implementation manners, in another implementation manner of the third aspect, a format of the reply instruction of the second instruction is 101XX, X indicates 1 bit, XX=01 indicates that the power adapter has received the second instruction, and when XX is any value except 01, it indicates that the communication between the mobile terminal and the power adapter becomes abnormal.

In combination with the third aspect or any of the above implementation manners, in another implementation manner of the third aspect, the communication control circuit is configured to transmit a third instruction to the power adapter, and the third instruction indicates a maximum charging current currently supported by the mobile terminal. The communication control circuit is configured to receive a reply instruction of the third instruction from the power adapter, and the reply instruction of the third instruction indicates that the power adapter has received the third instruction, or the third instruction indicates that the mobile terminal is ready to enter the constant current phase.

In combination with the third aspect or any of the above implementation manners, in another implementation manner of the third aspect, a format of the third instruction is 101010YYY000, Y indicates 1 bit, and the maximum charging current currently supported by the mobile terminal equals to 3000+(YYY*250) mA.

In combination with the third aspect or any of the above implementation manners, in another implementation manner of the third aspect, a format of the reply instruction of the third instruction is 101XX, X indicates 1 bit, XX=01 indicates that the power adapter has received the third instruction, and when XX is any value except 01, it indicates that the communication between the mobile terminal and the power adapter becomes abnormal.

In combination with the third aspect or any of the above implementation manners, in another implementation manner of the third aspect, the communication control circuit is configured to constantly transmit a fourth instruction to the power adapter, and the fourth instruction indicates the voltage of the battery. The communication control circuit is configured to receive a reply instruction of the fourth instruction from the power adapter, and the reply instruction of the fourth instruction indicates that the power adapter has received the fourth instruction.

In combination with the third aspect or any of the above implementation manners, in another implementation manner of the third aspect, a format of the fourth instruction is 101011YYYYYY, Y indicates 1 bit, and the voltage of the battery equals 3404+(YYYYYY*16) mV.

In combination with the third aspect or any of the above implementation manners, in another implementation manner of the third aspect, the reply instruction of the fourth instruction further indicates that the USB interface is in bad contact, or indicates that the impedance of the charge circuit between the power adapter and the mobile terminal is abnormal, and is ready to exit the quick charging mode, or indicates that the quick charging communication process needs to be reactivated.

In combination with the third aspect or any of the above implementation manners, in another implementation manner of the third aspect, a format of the reply instruction of the fourth instruction is 101XX, X indicates 1 bit, XX=01 indicates that the power adapter has received the fourth instruction, XX=11 indicates that the USB interface is in bad contact, or indicates that the impedance of the charge circuit between the power adapter and the mobile terminal is abnormal, and is ready to exit the quick charging mode, or indicates that the quick charging communication process needs to be reactivated, and when XX is any value except 01 and 11, it indicates that the communication between mobile terminal and the power adapter becomes abnormal.

In combination with the third aspect or any of the above implementation manners, in another implementation manner of the third aspect, the communication control circuit is further configured to transmit a fifth instruction to the power adapter, and the fifth instruction indicates a maximum voltage of the battery. The communication control circuit is further configured to receive a reply instruction of the fifth instruction, and the reply instruction of the fifth instruction indicates that the power adapter has received the fifth instruction.

In combination with the third aspect or any of the above implementation manners, in another implementation manner of the third aspect, a format of the fifth instruction is 101100YYYYYY, Y indicates 1 bit, and the maximum voltage of the battery is 4100+YYYYYY*10 mV.

In combination with the third aspect or any of the above implementation manners, in another implementation manner of the third aspect, a format of the reply instruction of the fifth instruction is 101XX, X indicates 1 bit, XX=01 indicates that the power adapter has received the fifth instruction, and when XX is any value except 01, it indicates that the communication between the mobile terminal and the power adapter becomes abnormal.

In combination with the third aspect or any of the above implementation manners, in another implementation manner of the third aspect, the communication control circuit is further configured to execute at least one of following operations when the communication between the power adapter and the mobile terminal becomes abnormal, and the following operations comprise: exiting the quick charging mode, charging the battery in the normal charging mode, stopping charging, or reactivating the quick charging communication process.

In combination with the third aspect or any of the above implementation manners, in another implementation manner of the third aspect, an instruction transmitted from the mobile terminal to the power adapter comprises multiple bits, when the mobile terminal transmits any instruction, the mobile terminal firstly transmits a most significant bit (MSB) of the multiple bits of the any instruction; or an instruction received from the power adapter by the mobile terminal comprises multiple bits, when the mobile terminal receives an instruction, the mobile terminal firstly receives a MSB of the multiple bits of the instruction.

In combination with the third aspect or any of the above implementation manners, in another implementation manner of the third aspect, clock signals used in the communication between the power adapter and the mobile terminal are provided by the power adapter.

In combination with the third aspect or any of the above implementation manners, in another implementation manner of the third aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the third aspect or any of the above implementation manners, in another implementation manner of the third aspect, each instruction received from the mobile terminal by the power adapter comprises a 12-bit data, the power adapter receives the 12-bit data from the mobile terminal via twelve continuous clock periods of the clock signal, level of previous 500 μs of each of the twelve continuous clock periods is high, and level of latter 10 μs of each of the twelve continuous clock periods is low; or each reply instruction transmitted from the power adapter to the mobile terminal comprises a 5-bit data, the power adapter transmits the 5-bit data to the mobile terminal via five continuous clock periods of the clock signal, level of previous 10 μs of each of the five continuous clock periods is low, and level of latter 500 μs of each of the five continuous clock periods is high.

In combination with the third aspect or any of the above implementation manners, in another implementation manner of the third aspect, during a process that the power adapter receives an instruction from the mobile terminal, a minimum value of high level of the clock signal used between the power adapter and the mobile terminal equals to VDD of the power adapter minus 0.7V; or during the process that the power adapter receives an instruction from the mobile terminal, a maximum value of low level of the clock signal used between the power adapter and the mobile terminal is 0.8V; or during a process that the power adapter transmits an instruction to the mobile terminal, a minimum value of high level of the clock signal used between the power adapter and the mobile terminal equals to 0.25VDD+0.8V; or during the process that the power adapter transmits an instruction to the mobile terminal, a maximum value of the high level of the clock signal used between the power adapter and the mobile terminal is 4.5V; or during the process that the power adapter transmits an instruction to the mobile terminal, a maximum value of low level of the clock signal is 0.15VDD. The VDD is a work voltage of the power adapter, and/or the VDD is greater than 3.2V and less than 4.5V.

In combination with the fourth aspect, in an implementation manner of the fourth aspect, the first instruction further indicates path impedance of the mobile terminal, the path impedance of the mobile terminal is configured for the power adapter to determine whether the USB interface is in good contact, or to determine whether impedance of a charge circuit between the power adapter and the mobile terminal is abnormal.

In combination with the fourth aspect or any of the above implementation manners, in another implementation manner of the fourth aspect, a format of the first instruction is 101000YYYYY0, Y indicates 1 bit, and the path impedance of the mobile terminal equals to YYYYY*5 mΩ.

In combination with the fourth aspect or any of the above implementation manners, in another implementation manner of the fourth aspect, the communication control circuit is further configured to transmit a reply instruction of the first instruction to the mobile terminal, and the reply instruction of the first instruction indicates that the power adapter supports the quick charging mode, or indicates that the power adapter agrees to charge the battery in the quick charging mode.

In combination with the fourth aspect or any of the above implementation manners, in another implementation manner of the fourth aspect, a format of the reply instruction of the first instruction is 101XX, X indicates 1 bit, XX=01 indicates that the power adapter has received the first instruction, and when XX is any value except 01, it indicates that the communication between the mobile terminal and the power adapter becomes abnormal.

In combination with the fourth aspect or any of the above implementation manners, in another implementation manner of the fourth aspect, the communication control circuit is configured to receive a second instruction from the mobile terminal, and the second instruction indicates that the output voltage of the power adapter is high, low, or proper. The communication control circuit is configured to transmit a reply instruction of the second instruction to the mobile terminal, and the reply instruction of the second instruction indicates that the power adapter has received the second instruction.

In combination with the fourth aspect or any of the above implementation manners, in another implementation manner of the fourth aspect, a format of the second instruction is 101001000YY0, Y indicates 1 bit, YY=11 indicates that the output voltage of the power adapter is proper, YY=10 indicates that the output voltage of the power adapter is high, YY=01 indicates that the output voltage of the power adapter is low, and YY=00 indicates that the communication between the mobile terminal and the power adapter becomes abnormal.

In combination with the fourth aspect or any of the above implementation manners, in another implementation manner of the fourth aspect, a format of the reply instruction of the second instruction is 101XX, X indicates 1 bit, XX=01 indicates that the power adapter has received the second instruction, and when XX is any value except 01, it indicates that the communication between the mobile terminal and the power adapter becomes abnormal.

In combination with the fourth aspect or any of the above implementation manners, in another implementation manner of the fourth aspect, the communication control circuit is configured to receive a third instruction from the mobile terminal, and the third instruction indicates a maximum charging current currently supported by the mobile terminal. The communication control circuit is configured to transmit a reply instruction of the third instruction to the mobile terminal, and the reply instruction of the third instruction indicates that the power adapter has received the third instruction, or the third instruction indicates that the mobile terminal is ready to enter the constant current phase.

In combination with the fourth aspect or any of the above implementation manners, in another implementation manner of the fourth aspect, a format of the third instruction is 101010YYY000, Y indicates 1 bit, and the maximum charging current currently supported by the mobile terminal equals to 3000+(YYY*250) mA.

In combination with the fourth aspect or any of the above implementation manners, in another implementation manner of the fourth aspect, a format of the reply instruction of the third instruction is 101XX, X indicates 1 bit, XX=01 indicates that the power adapter has received the third instruction, and when XX is any value except 01, it indicates that the communication between the mobile terminal and the power adapter becomes abnormal.

In combination with the fourth aspect or any of the above implementation manners, in another implementation manner of the fourth aspect, the communication control circuit is configured to constantly receive a fourth instruction from the mobile terminal, and the fourth instruction indicates the voltage of the battery. The communication control circuit is configured to transmit a reply instruction of the fourth instruction to the mobile terminal, and the reply instruction of the fourth instruction indicates that the power adapter has received the fourth instruction.

In combination with the fourth aspect or any of the above implementation manners, in another implementation manner of the fourth aspect, a format of the fourth instruction is 101011YYYYYY, Y indicates 1 bit, and the voltage of the battery equals 3404+(YYYYYY*16) mV.

In combination with the fourth aspect or any of the above implementation manners, in another implementation manner of the fourth aspect, the reply instruction of the fourth instruction further indicates that the USB interface is in bad contact, or indicates that the impedance of the charge circuit between the power adapter and the mobile terminal is abnormal, and is ready to exit the quick charging mode, or indicates that the quick charging communication process needs to be reactivated.

In combination with the fourth aspect or any of the above implementation manners, in another implementation manner of the fourth aspect, a format of the reply instruction of the fourth instruction is 101XX, X indicates 1 bit, XX=01 indicates that the power adapter has received the fourth instruction, XX=11 indicates that the USB interface is in bad contact, or indicates that the impedance of the charge circuit between the power adapter and the mobile terminal is abnormal, and is ready to exit the quick charging mode, or indicates that the quick charging communication process needs to be reactivated, and when XX is any value except 01 and 11, it indicates that the communication between mobile terminal and the power adapter becomes abnormal.

In combination with the fourth aspect or any of the above implementation manners, in another implementation manner of the fourth aspect, the communication control circuit is further configured to receive a fifth instruction from the mobile terminal, and the fifth instruction indicates a maximum voltage of the battery. The communication control circuit is further configured to transmit a reply instruction of the fifth instruction to the mobile terminal, and the reply instruction of the fifth instruction indicates that the power adapter has received the fifth instruction.

In combination with the fourth aspect or any of the above implementation manners, in another implementation manner of the fourth aspect, a format of the fifth instruction is 101100YYYYYY, Y indicates 1 bit, and the maximum voltage of the battery is 4100+YYYYYY*10 mV.

In combination with the fourth aspect or any of the above implementation manners, in another implementation manner of the fourth aspect, a format of the reply instruction of the fifth instruction is 101XX, X indicates 1 bit, XX=01 indicates that the power adapter has received the fifth instruction, and when XX is any value except 01, it indicates that the communication between the mobile terminal and the power adapter becomes abnormal.

In combination with the fourth aspect or any of the above implementation manners, in another implementation manner of the fourth aspect, the communication control circuit is further configured to execute at least one of following operations when the communication between the power adapter and the mobile terminal becomes abnormal, and the following operations comprise: exiting the quick charging mode, charging the battery in the normal charging mode, stopping charging, or reactivating the quick charging communication process.

In combination with the fourth aspect or any of the above implementation manners, in another implementation manner of the fourth aspect, an instruction received from the mobile terminal by the power adapter comprises multiple bits, when the power adapter receives any instruction, the power adapter firstly receives a most significant bit (MSB) of the multiple bits of the any instruction; or an instruction transmitted from the power adapter to the mobile terminal comprises multiple bits, when the power adapter transmits an instruction, the power adapter firstly transmits a MSB of the multiple bits of the instruction.

In combination with the fourth aspect or any of the above implementation manners, in another implementation manner of the fourth aspect, clock signals used in the communication between the power adapter and the mobile terminal are provided by the power adapter.

In combination with the fourth aspect or any of the above implementation manners, in another implementation manner of the fourth aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the fourth aspect or any of the above implementation manners, in another implementation manner of the fourth aspect, each instruction received from the mobile terminal by the power adapter comprises a 12-bit data, the power adapter receives the 12-bit data from the mobile terminal via twelve continuous clock periods of the clock signal, level of previous 500 μs of each of the twelve continuous clock periods is high, and level of latter 10 μs of each of the twelve continuous clock periods is low; or each instruction transmitted from the power adapter to the mobile terminal comprises a 5-bit data, the power adapter transmits the 5-bit data to the mobile terminal via five continuous clock periods of the clock signal, level of previous 10 μs of each of the five continuous clock periods is low, and level of latter 500 μs of each of the five continuous clock periods is high.

In combination with the fourth aspect or any of the above implementation manners, in another implementation manner of the fourth aspect, during a process that the power adapter receives an instruction from the mobile terminal, a minimum value of high level of the clock signal used between the power adapter and the mobile terminal equals to VDD of the power adapter minus 0.7V; or during the process that the power adapter receives an instruction from the mobile terminal, a maximum value of low level of the clock signal used between the power adapter and the mobile terminal is 0.8V; or during a process that the power adapter transmits an instruction to the mobile terminal, a minimum value of high level of the clock signal used between the power adapter and the mobile terminal equals to 0.25VDD+0.8V; or during the process that the power adapter transmits an instruction to the mobile terminal, a maximum value of the high level of the clock signal used between the power adapter and the mobile terminal is 4.5V; or during the process that the power adapter transmits an instruction to the mobile terminal, a maximum value of low level of the clock signal used between the power adapter and the mobile terminal is 0.15VDD. The VDD is a work voltage of the power adapter, and/or the VDD is greater than 3.2V and less than 4.5V.

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

FIG. 1 is a schematic diagram of a quick charging process in accordance with an embodiment of the present disclosure.

As illustrated by FIG. 1, a quick charging communication process may include five phases.

Phase 1:

A mobile terminal can detect a type of a power adapter via a positive data (D+) line and a negative data (D−) line. When it is determined that the power adapter is a non-USB charging device, a current absorbed by the mobile terminal can be greater than a preset current threshold I2. When the power adapter determines that within a preset time length (for example, continuous T1 time length) an output current of the power adapter is greater than or equal to I2, the power adapter determines that the mobile terminal has recognized the type of the power adapter, and the power adapter activates a handshake communication between the power adapter and the mobile terminal. The power adapter transmits a first instruction to query whether the mobile terminal is to activate a quick charging mode.

When a reply instruction received from the mobile terminal by the power adapter indicates that the mobile terminal disagrees to activate the quick charging mode, the power adapter redetects the output current of the power adapter. When the output current of the power adapter is still greater than or equal to I2, the power adapter retransmits the request to query whether the mobile terminal is to activate the quick charging mode, and the above steps of the phase 1 are repeated until the mobile terminal agrees to activate the quick charging mode or the output current of the power adapter is no longer greater than or equal to I2.

When the mobile terminal agrees to activate quick charging, the quick charging communication process enters a phase 2.

Phase 2:

The power adapter can output different voltage level. The power adapter transmits a second instruction to the mobile terminal to query the mobile terminal for whether an output voltage of the power adapter is proper (that is, whether the output voltage is proper to be a charging voltage of the quick charging mode).

The mobile terminal transmits a reply to the power adapter to inform the power adapter that the output voltage of the power adapter is high, low, or proper. If the reply the power adapter received from the mobile terminal indicates that the output voltage of the power adapter is high or low, the power adapter selects another output voltage level, and retransmits the second instruction to the mobile terminal to requery the mobile terminal for whether the output voltage of the power adapter is proper.

The above steps of the phase 2 are repeated until the mobile terminal returns a reply to the power adapter to inform the power adapter that the output voltage of the power adapter is proper, and the quick charging communication process enters a phase 3.

Phase 3:

The power adapter transmits a third instruction to the mobile terminal to query a maximum charging current which is currently supported by the mobile terminal. The mobile terminal transmits a reply to the power adapter to inform the power adapter of the maximum charging current which is currently supported by the mobile terminal, and the quick charging communication process enters a phase 4.

Phase 4:

The power adapter sets the output current of the power adapter to be the maximum charging current which is currently supported by the mobile terminal, and the quick charging communication process enters a constant current phase, that is, a phase 5.

Phase 5:

After entering the constant current phase, the power adapter transmits a fourth instruction every a time interval to query a current voltage of a battery of the mobile terminal. The mobile terminal can transmit a reply to the power adapter to inform the power adapter of the current voltage of the battery of the mobile terminal. The power adapter can determine whether a USB interface is in good contact and whether it is need to decrease the current charging current value of the mobile terminal according to the reply for indicating the current voltage of the battery of the mobile terminal. When the power adapter determines that the USB interface is in bad contact, the power adapter transmits a fifth instruction to the mobile terminal, and then resets to reenter the phase 1.

It can be understood that in the constant current phase the output current of the power adapter does not keep unchanged all the time. The constant current phase is a multi-stage constant current phase, that is, the output current of the power adapter keeps unchanged within a period.

For the above quick communication process applied between the power adapter and the mobile terminal, a quick charging communication instruction set applied between the power adapter and the mobile terminal can be defined. For example, the quick charging communication instruction set is illustrated by FIG. 1.

TABLE 1

Quick charging communication instruction set

Instruction 1: requesting for quick charging

| | | |
|---|---|---|
| Power adapter –> Mobile terminal | 10101000 | 0xA8 |
| Mobile terminal –> Power adapter | 101XYYYYYY | X: 1 –> Agree 0 –> Disagree, Path impedance = YYYYYY * 5(mΩ) |

Instruction 2: querying whether a voltage of the power adapter is proper

| | | |
|---|---|---|
| Power adapter –> Mobile terminal | 10100100 | 0xA4 |
| Mobile terminal –> Power adapter | 1010XX0000 | XX: 11 –> Proper 10 –> High 01 –> Low 00 –> Error |

Instruction 3: querying for a maximum charging current which is currently supported by the mobile terminal

| | | |
|---|---|---|
| Power adapter –> Mobile terminal | 10100110 | 0xA6 |
| Mobile terminal –> Power adapter | 1010XXXXXX | Maximum charging current currently supported by the mobile terminal = 3000 + (XXXXXX * 250)(mA) |

Instruction 4: querying for a current voltage of a battery of the mobile terminal

| | | |
|---|---|---|
| Power adapter –> Mobile terminal | 10100010 | 0xA2 |
| Mobile terminal –> Power adapter | 101XYYYYYY | X: 1 –> Being charged 0 –> Uncharged, Battery voltage = 3404 + (YYYYYY * 16)(mV) |

Instruction 5: informing the mobile terminal that USB connection is poor and quick charging should be stopped

| | | |
|---|---|---|
| Power adapter –> Mobile terminal | 10110010 | 0xB2 |
| Mobile terminal –> Power adapter | NONE | |

From table 1, it can be seen that for each communication the power adapter firstly transmits an 8-bit data, and then the mobile terminal returns a 10-bit data. When the power adapter transmits a data, the power adapter can firstly transmit a most significant bit (MSB). Similarly, when the power adapter receives a data, the power adapter firstly receives a MSB. Clock signals for data transmission and data reception of the power adapter can be provided by the power adapter.

When the power adapter transmits a data, the power adapter transmits each bit of the data before transmitting a clock interrupt signal, which can guarantee the accuracy of the data received by the mobile terminal. When the power adapter receives a data, the power adapter can firstly transmit the clock interrupt signal, and then receive each bit of the data after a certain time, which can guarantee the accuracy and reliability of the data received by the power adapter.

Figure 2:
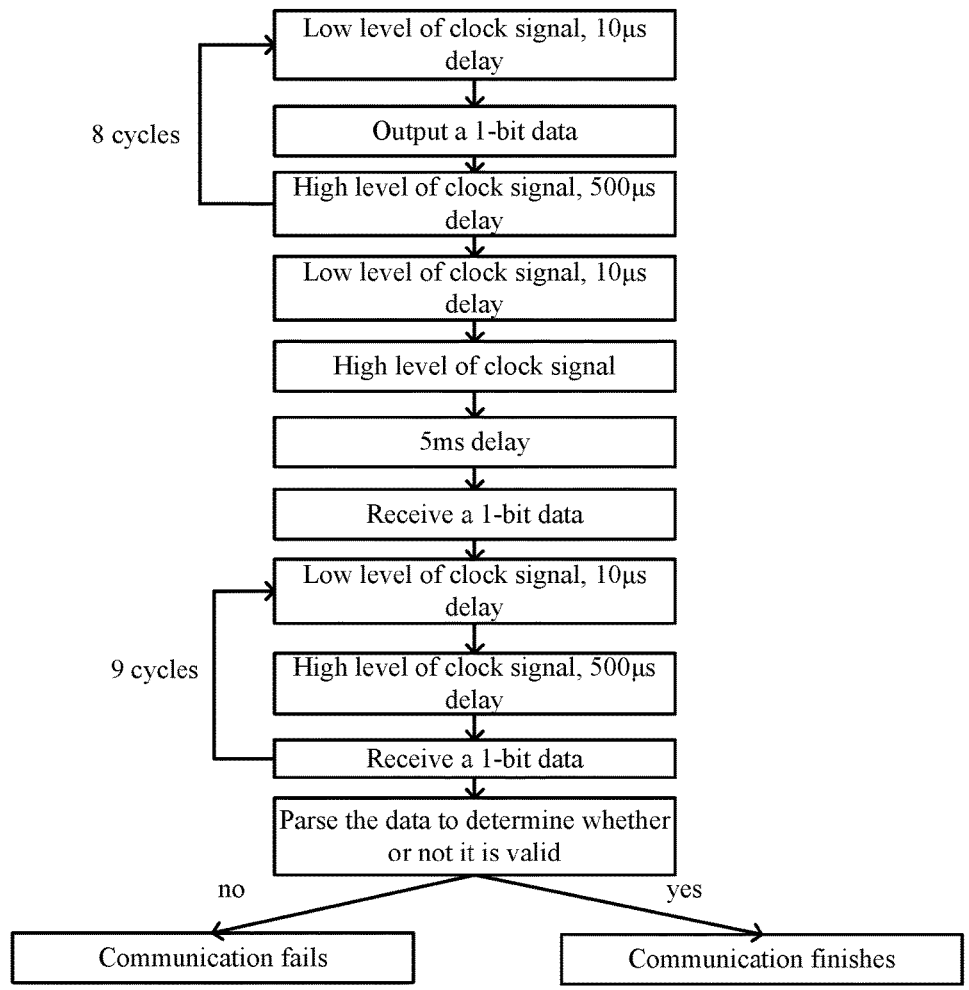
FIG. 2 is a schematic view showing that a power adapter implements a data reception and transmission in accordance with an embodiment of the present disclosure.

FIG. 2 is a schematic view illustrating that the power adapter implements a data reception and data transmission in accordance with an embodiment of the present disclosure. For FIG. 2, there are a number of methods for parsing a data to determine whether the data is valid. For example, previous n bits of a data can be defined as 101 in advance. When previous 3 bits of a data received by the power adapter is not 101, the data is determined as an invalid data, and communication fails. Or, a received data is defined to include 10 bits in advance. If a received data does not include 10 bits, the received data is determined as an invalid data, and communication fails.

Figure 3:
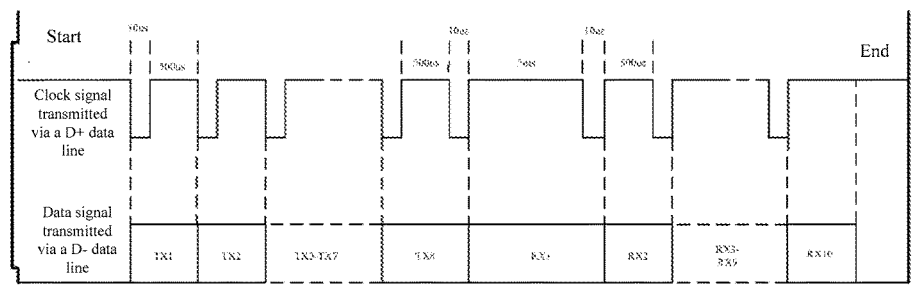
FIG. 3 is a schematic view of a communication sequence of a power adapter in accordance with an embodiment of the present disclosure.
Figure 4:
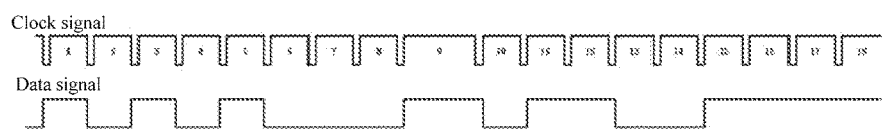
FIG. 4 is a schematic view of a communication sequence of a power adapter in accordance with an embodiment of the present disclosure.

FIG. 3 is a schematic view of a communication sequence of the power adapter in accordance with an embodiment of the present disclosure. From FIG. 3, a relationship between a communication sequence indicated by the clock signals which are transmitted by the D+ data line and data signals transmitted by the D– data line. FIG. 4 illustrates a detailed example. In FIG. 4, after the power adapter transmits the instruction 10101000 to the mobile terminal, the power adapter receives the reply instruction 1011001111 from the mobile terminal.

The above quick charging communication process is finished based on negotiation between the power adapter and the mobile terminal, and safety of quick charging can be ensured.

From the above, it can be seen that during the whole process, the power adapter acts as a host, and conducts a handshake communication with the mobile terminal actively. The power adapter firstly determines whether to activate the quick charging communication process. After activating the quick charging communication process, the power adapter transmits an instruction to the mobile terminal actively. A condition that causes the power adapter to determine to activate the quick charging process is that the power adapter determines that within the preset time period the output current of the power adapter is greater than or equal to I2. When the power adapter determines that the condition is satisfied, the power adapter determines that the mobile terminal has recognized the type of the power adapter, that is, determines that the mobile terminal has recognized that the power adapter is a non-USB charging device (or has recognized that the power adapter is a standard charging device, and is not a non-standard charging device, such as a computer, or has recognized that the power adapter is not a computer, that is, the non-USB charging device can refer to any other charging device except a computer). By means of such a detection manner, the power adapter can be acted as a host, and the quick charging communication process is simplified. However, this manner is similar to a blind detection manner, that is, the power adapter guesses that the mobile terminal has recognized the type of the power adapter. Adopting the blind detection manner, certain errors may occur. For example, if a standard charging current of some mobile terminals is I2 (or about I2), the current detected by the power adapter may not be exactly right, and the power adapter determines that the charging current of such mobile terminals is less than I2, which may result in that such mobile terminals cannot activate quick charging communication all the time and have to adopt a standard charging method for charging.

Figure 5:
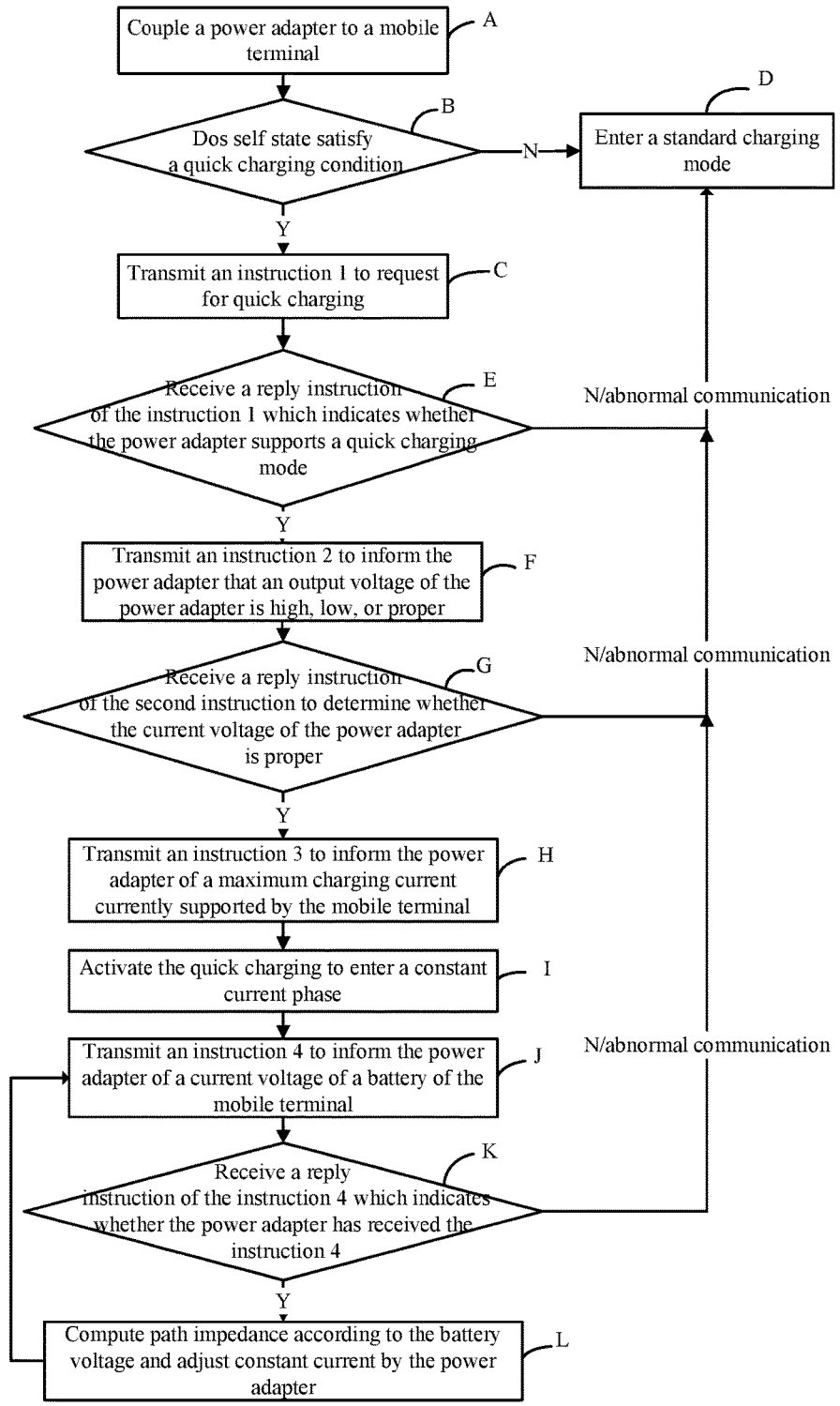
FIG. 5 is a schematic view of a quick charging method in accordance with an embodiment of the present disclosure.

To avoid the above problem, the following will illustrate a quick charging method in accordance with another embodiment of the present disclosure in combination with FIG. 5. In an embodiment illustrated by FIG. 5, the quick communication process between the mobile terminal and the power adapter is activated by the mobile terminal, that is, the mobile terminal actively transmits a quick charging request to the power adapter. What needs to be illustrated is that after the mobile terminal transmits the quick charging request, the subsequent process can be still the same as the process illustrated by FIGS. 1-4. That is, the power adapter actively activates the quick charging communication with the mobile terminal to query a voltage, a current, and other parameters of the quick charging. Or, after the mobile terminal activates the quick charging, in the subsequent communication process the mobile terminal actively transmits instructions to the power adapter, that is, the mobile terminal actively provides the mobile terminal with the voltage of the battery, the maximum charging current currently supported by the mobile terminal, and so on. The power adapter may do not reply, or simply reply that the power adapter has received the instruction, the power adapter does not receive the instruction, or the power adapter agrees or disagrees. What needs to be further illustrated is that the quick charging communication instruction set and the communication sequence relationship illustrated by the above (for example, table 1, FIGS. 2-4) can be still applied in the embodiments that the mobile terminal actively activates the quick charging request directly or after simple variation. For example, after the mobile terminal activates the quick charging request, if the subsequent communication process is still activated by the power adapter (in the subsequent phases of the quick charging process the power adapter actively activates the handshake request, that is, actively transmits the above instructions 2-5), the above instructions 2-5 can be still used, and the mobile terminal transmits the instruction 1. If the subsequent communication process is finished by the mobile terminal, an instruction set suitable for that the mobile terminal actively initiates the communication can be defined. The instruction set illustrated by FIG. 2 can be used.

TABLE 2

Quick charging communication instruction set

| Instruction type | Instruction format | Instruction illustration |
| --- | --- | --- |
| Fourth instrution (tell_volt) | | |
| Mobile terminal -> Power adapter | 101011YYYYYY | Battery voltage = 3404 + (YYYYYY * 16) |
| Power adapter -> Mobile terminal | 101XX | XX: 01 -> Received; 11 -> USB contact is not good, impedance is too high; other formats -> abnormal communication |
| Second instruction (tell_is_vbus_ok) | | |
| Mobile terminal -> Power adapter | 101001000YY0 | YY: 11 -> an output voltage of the power adapter is proper; 10 -> the output voltage of the power adapter is too high; 01 -> the output voltage of the power adapter is too low; 00 -> abnormal communication |
| Power adapter -> mobile terminal | 101XX | XX: 01 -> Received; Other formats -> abnormal communication |
| First instrution (tell_fastchg_ornot) | | |
| Mobile terminal -> Power adapter | 101000YYYYY0 | R = YYYYY * 5 |
| Power adapter -> Mobile terminal | 101XX | XX: 01 -> Received; Other formats -> Abnormal communication |
| Third instruction (tell_adapter_current_level) | | |
| Mobile terminal > Power adapter | 101010YYY000 | Maximum charging current currently supported by the mobile terminal = 3000 + (YYY * 250) |
| Power adapter -> Mobile terminal | 101XX | XX: 01 -> Received; Other formats -> Abnormal communication |
| Fifth instruction (tell_adapter_battery_max_volt) | | |
| Mobile terminal -> Power adapter | 101100YYYYYY | Maximum voltage of the battery = 4100 + (YYYYYY * 10) |
| Power adapter -> Mobile terminal | 101XX | XX: 01 -> Received; Other formats -> Abnormal communication |

What needs to be illustrated is that in the above table 3404 is 3404 mV (3.404V), 4100 is 4100 mV (4.1V), 3000 is 3000 mA (3 A), and 250 is 250 mA (0.25 A).

Certainly, after the mobile terminal actively initiates the quick charging request, in the subsequent communication process the mobile terminal and the power adapter can be respectively in charge of initiation work of some of the communication process. For example, the power adapter actively queries the mobile terminal for whether the output voltage is proper, the mobile terminal actively provides the power adapter with the battery voltage, and so on. In FIG. 5, from the perspective of the mobile terminal, the mobile terminal actively transmitting an instruction to the power adapter is taken as an example for illustration. It can be understood that steps or operations illustrated by FIG. 5 are just examples. The embodiments of the present disclosure can further execute other steps or variations of the steps of FIG. 5. In addition, the steps of FIG. 5 can be executed in other sequences different from the sequence of FIG. 5, and furthermore some of the operations of FIG. 5 may not be executed.

FIG. 5 includes following steps.

Step A: the mobile terminal recognizes a type of the power adapter when the power adapter is coupled to the mobile terminal.

When it is detected that the coupling device is a USB device, it indicates that the coupling device is not a specified adapter, and may be a computer.

Step B: the mobile terminal determines whether the self status satisfies a quick charging condition. When the self status satisfies the quick charging condition, step C is executed, otherwise step D is executed.

Step C: when the mobile terminal detects that self status satisfies the quick charging condition, the mobile terminal transmits an instruction 1 (corresponding to the first instruction described above) via D+ and/or D− to initiate the quick charging request.

Step D: if the self status does not satisfy the quick charging condition, for example, when the remaining capacity of the battery is great, or the interior temperature of the mobile terminal is not proper for quick charging, the mobile terminal may not transmit the quick charging request, and is charged in a standard charging mode (corresponding to the normal charging mode described above).

Step E: the mobile terminal determines whether a reply instruction of the instruction 1 which indicates whether the power adapter supports a quick charging mode is received, and the reply instruction of the instruction 1 indicates whether the power adapter supports the quick charging mode. When the reply instruction of the instruction 1 is received, step F is executed, otherwise step D is executed.

When the power adapter supports the quick charging mode, step F is executed. When the power adapter does not support the quick charging mode or the communication becomes abnormal (for example, the reply instruction of the instruction 1 is not received), the mobile terminal is charged in the standard charging mode.

Step F: the mobile terminal transmits an instruction 2 to the power adapter to inform the power adapter that the current output voltage is high, low, or proper.

The power adapter can output different voltage levels. When the power adapter receives the instruction 2, the power adapter outputs another voltage level according to the instruction 2 until the received instruction 2 indicates that the output voltage of the power adapter is proper.

Optionally, in an embodiment, the instruction 2 can indicate the current battery voltage, so as to cause the power adapter to adjust the output voltage according to the battery voltage. Specifically, a mapping relationship between the battery voltage and the charging voltage of the quick charging mode can be established beforehand. In actual use, the power adapter can determine the voltage of quick charging corresponding to the current battery voltage according to the mapping relationship, and then the power adapter adjusts the output voltage to be the voltage of the quick charging.

Step G: the mobile terminal determines whether the reply instruction of the instruction 2 from the power adapter is received. When the reply instruction of the instruction 2 is received, step H is executed, otherwise step D is executed.

The step is an optional step. The reply instruction of the instruction 2 can indicate that the power adapter has received the instruction 2, or the power adapter has adjusted the output voltage according to the battery voltage.

Step H: the power adapter transmits an instruction 3 to the power adapter.

The instruction 3 can indicates a maximum charging current currently supported by the mobile terminal. After the power adapter receives the instruction 3, the power adapter can reply that the instruction 3 has been received.

Step I: the quick charging is activated and the charging process enters a constant current phase.

Step J: the mobile terminal constantly transmits an instruction 4 to the power adapter to inform the power adapter of the battery voltage, so as to cause the power adapter to finish impedance detection and adjustment of constant current.

The power adapter can transmit an instruction 4 to the power adapter in a certain period. Or, the mobile terminal can transmit the instruction 4 in a preset mode, and the preset mode is established according to charging characteristics of the battery.

In addition, the power adapter can be requested to transmit a reply each time the instruction 4 is received. If the mobile terminal does not receive a reply, the mobile terminal determines that the communication becomes abnormal, and the mobile terminal is charged in the standard charging mode.

Step K: the mobile terminal determines whether a reply instruction of the instruction 4 which indicates whether the power adapter has received the instruction 4 is received. When the reply instruction of the instruction 4 is received, step L is executed, otherwise step D is executed.

Step L: the power adapter computes path impedance according to the battery voltage and adjusts constant current.

In the embodiment of the present disclosure, after the mobile terminal recognizes the type of the power adapter, the mobile terminal actively initiates the quick charging request, thus the whole quick charging process is reliable and reasonable.

Figure 6:
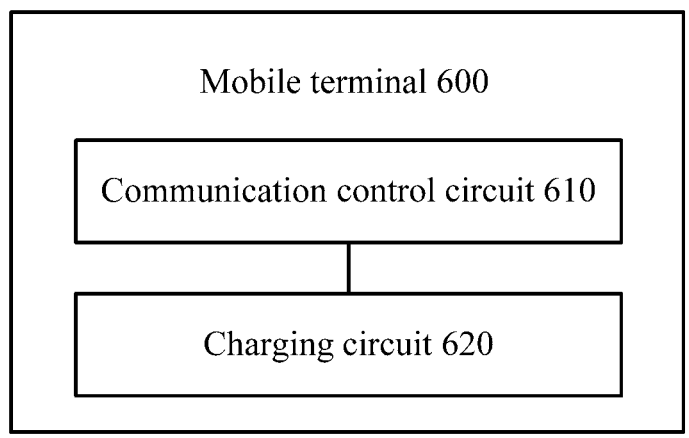
FIG. 6 is a diagrammatic view of a mobile terminal in accordance with an embodiment of the present disclosure.
Figure 7:
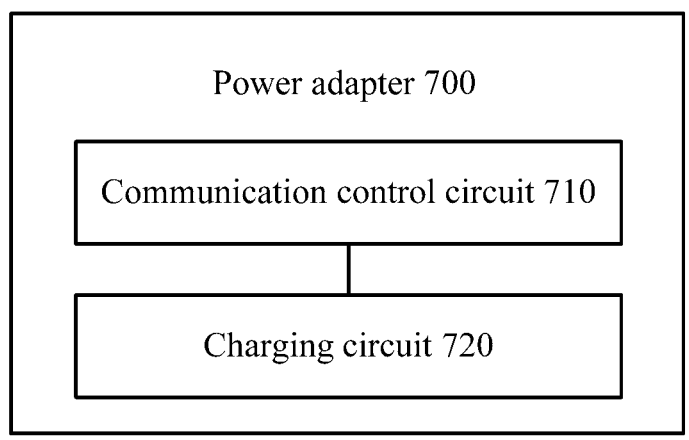
FIG. 7 is a diagrammatic view of a power adapter in accordance with an embodiment of the present disclosure.

In combination with FIGS. 6-7, the following will specifically describe the mobile terminal and the power adapter of the embodiments of the present disclosure. It can be understood that the mobile terminal of FIG. 6 can implement various functions described in the quick charging method, and the power adapter of FIG. 7 can implement various functions described in the quick charging method. To avoid repetition, detailed description will be omitted.

FIG. 6 is a diagrammatic view of a mobile terminal in accordance with an embodiment of the present disclosure. A mobile terminal 600 of FIG. 6 is coupled to a power adapter via a USB interface. Power lines of the USB interface are used for charging a battery of the mobile terminal 600. Data lines of the USB interface are used for communication between the mobile terminal 600 and the power adapter. The mobile terminal 600 supports a normal charging mode and a quick charging mode. A charging speed of the quick charging mode is greater than that of the normal charging mode. The mobile terminal 600 includes a communication control circuit 610 and a charging circuit 620.

The communication control circuit 610 is configured to determine a type of the power adapter when it is detected that the power adapter is coupled to the mobile terminal 600, activate a quick charging communication process between the mobile terminal 600 and the power adapter when it is determined that the power adapter is a non-USB power adapter, and transmit a first instruction to the power adapter, and the first instruction is configured to request the power adapter to charge the battery in the quick charging mode. The communication control circuit 610 is further configured to communicate with the power adapter to determine a charging voltage of the quick charging mode, communicate with the power adapter to determine a charging current of the quick charging mode, and communicate with the power adapter to constantly transmit information of a voltage of the battery to the power adapter when the power adapter adjusts an output voltage and output current of the power adapter to be the charging voltage and the charging current of the quick charging mode respectively and enters a constant current phase, so as to cause the power adapter to adjust the output current according to the voltage of the battery, and charge the battery in a multi-stage constant current mode via the charging circuit 620.

In embodiments of the present disclosure, the power adapter does not increase the charging current blindly for quick charging, but negotiates with the mobile terminal via communication with the mobile terminal 600 to determine whether the quick charging mode can be adopted. Comparing with the present technology, the security of the quick charging process is improved.

Optionally, in an embodiment, the first instruction further indicates path impedance of the mobile terminal 600. The path impedance of the mobile terminal 600 is configured for the power adapter to determine whether the USB interface is in good contact, or whether impedance of a charge circuit between the power adapter and the mobile terminal 600 is abnormal.

Optionally, in an embodiment, a format of the first instruction is 101000YYYYY0, Y indicates 1 bit, and the path impedance of the mobile terminal 600 equals to YYYYY*5 mΩ.

Optionally, in an embodiment, the communication control circuit 610 is further configured to receive a reply instruction of the first instruction from the power adapter, and the reply instruction of the first instruction indicates that the power adapter supports the quick charging mode, or that the power adapter agrees to charge the battery in the quick charging mode.

Optionally, in an embodiment, a format of the reply instruction of the first instruction is 101XX, X indicates 1 bit, XX=01 indicates that the power adapter has received the first instruction, and when XX is any value except 01, it indicates that the communication between the mobile terminal 600 and the power adapter becomes abnormal.

Optionally, in an embodiment, the communication control circuit 610 is configured to transmit a second instruction to the power adapter, and the second instruction indicates that the output voltage of the power adapter is high, low, or proper. The communication control circuit 610 is configured to receive a reply instruction of the second instruction, and the reply instruction of the second instruction indicates that the power adapter has received the second instruction.

Optionally, in an embodiment, a format of the second instruction is 101001000YY0, Y indicates 1 bit, YY=11 indicates that the output voltage of the power adapter is proper, YY=10 indicates that the output voltage of the power adapter is high, YY=01 indicates that the output voltage of the power adapter is low, and YY=00 indicates that the communication between the mobile terminal 600 and the power adapter becomes abnormal.

Optionally, in an embodiment, a format of the reply instruction of the second instruction is 101XX, X indicates 1 bit, XX=01 indicates that the power adapter has received the second instruction, and when XX is any values except 01, it indicates that the communication between the mobile terminal 600 and the power adapter becomes abnormal.

Optionally, in an embodiment, the communication control circuit 610 is configured to transmit a third instruction to the power adapter, and the third instruction indicates a maximum charging current currently supported by the mobile terminal 600. The communication control circuit 610 is configured to receive a reply instruction of the third instruction from the power adapter, and the reply instruction of the third instruction indicates that the power adapter has received the third instruction, or the third instruction indicates that the mobile terminal 600 is ready to enter the constant current phase.

Optionally, in an embodiment, a format of the third instruction is 101010YYY000, and Y indicates 1 bit. The maximum charging current which is currently supported by the mobile terminal 600 equals to 3000+(YYY*250) mA.

Optionally, in an embodiment, a format of the reply instruction of the third instruction is 101XX, X indicates 1 bit, XX=01 indicates that the power adapter has received the third instruction, and when XX is any value except 01, it indicates that the communication between the mobile terminal 600 and the power adapter becomes abnormal.

Optionally, in an embodiment, the communication control circuit 610 is configured to constantly transmit a fourth instruction to the power adapter, and the fourth instruction indicates the voltage of the battery. The communication control circuit 610 is configured to receive a reply instruction of the fourth instruction from the power adapter, and the reply instruction of the fourth instruction indicates that the power adapter has received the fourth instruction.

Optionally, in an embodiment, a format of the fourth instruction is 101011YYYYYY, and Y indicates 1 bit. The voltage of the battery equals 3404+(YYYYYY*16) mV.

Optionally, in an embodiment, the reply instruction of the fourth instruction further indicates that the USB interface is in bad contact, or indicates that impedance of the charge circuit between the power adapter and the mobile terminal 600 is abnormal, and is ready to exit the quick charging mode, or indicates that the quick charging communication process needs to be reactivated.

Optionally, in an embodiment, a format of the reply instruction of the fourth instruction is 101XX, X indicates 1 bit, XX=01 indicates that the power adapter has received the fourth instruction, XX=11 indicates that the USB interface is in bad contact, or indicates that the impedance of the charge circuit between the power adapter and the mobile terminal 600 is abnormal, and is ready to exit the quick charging mode, or indicates that the quick charging communication process needs to be reactivated, and when XX is any value except 01 and 11, it indicates that the communication between mobile terminal 600 and the power adapter becomes abnormal.

Optionally, in an embodiment, the communication control circuit 610 is further configured to transmit a fifth instruction to the power adapter, and the fifth instruction indicates a maximum voltage of the battery. The communication control circuit 610 is further configured to receive a reply instruction of the fifth instruction, and the reply instruction of the fifth instruction indicates that the power adapter has received the fifth instruction.

Optionally, in an embodiment, a format of the fifth instruction is 101100YYYYYY, and Y indicates 1 bit. The maximum voltage of the battery is 4100+YYYYYY*10 mV.

Optionally, in an embodiment, a format of the reply instruction of the fifth instruction is 101XX, X indicates 1 bit, XX=01 indicates that the power adapter has received the fifth instruction, and when XX is any value except 01, it indicates that the communication between the mobile terminal 600 and the power adapter becomes abnormal.

Optionally, in an embodiment, the communication control circuit 610 is further configured to execute at least one of following operations when the communication between the power adapter and the mobile terminal 600 becomes abnormal, and the following operations include: exiting the quick charging mode, charging the battery in the normal charging mode, stopping charging, or reactivating the quick charging communication process.

Optionally, in an embodiment, an instruction transmitted from the mobile terminal 600 to the power adapter includes multiple bits. When the mobile terminal 600 transmits any instruction, the mobile terminal 600 firstly transmits a MSB of the multiple bits of the any instruction. Or, an instruction received from the power adapter by the mobile terminal 600 includes multiple bits. When the mobile terminal 600 receives a certain instruction, the mobile terminal 600 firstly receives a MSB of the multiple bits of the certain instruction.

Optionally, in an embodiment, clock signals used in the communication between the power adapter and the mobile terminal 600 are provided by the power adapter.

Optionally, in an embodiment, an instruction transmitted from the power adapter to the mobile terminal 600 includes multiple bits. During a process of transmitting each of the multiple bits, the power adapter firstly transmits each bit, and then transmits a clock interrupt signal. Or, a reply instruction received from the mobile terminal 600 by the power adapter includes multiple bits. During a process of receiving each of the multiple bits, the power adapter firstly transmits the clock interrupt signal, and then receives each bit after a preset time interval.

Optionally, in an embodiment, each instruction received from the mobile terminal 600 by the power adapter includes a 12-bit data. The power adapter receives the 12-bit data from the mobile terminal 600 via twelve continuous clock periods of the clock signal. Level of previous 500 μs of each of the twelve continuous clock periods is high, and level of latter 10 μs of each of the twelve continuous clock periods is low. Or, each reply instruction transmitted from the power adapter to the mobile terminal 600 includes a 5-bit data. The power adapter transmits the 5-bit data to the mobile terminal 600 via five continuous clock periods of the clock signal. Level of previous 10 μs of each of the five continuous clock periods is low, and level of latter 500 μs of each of the five continuous clock periods is high.

Optionally, in an embodiment, during a process that the power adapter receives an instruction from the mobile terminal 600, a minimum value of high level of the clock signal used between the power adapter and the mobile terminal 600 equals to VDD of the power adapter minus 0.7V. Or, during the process that the power adapter receives an instruction from the mobile terminal 600, a maximum value of low level of the clock signal used between the power adapter and the mobile terminal 600 is 0.8V. Or, during a process that the power adapter transmits an instruction to the mobile terminal 600, a minimum value of high level of the clock signal used between the power adapter and the mobile terminal 600 equals to 0.25VDD+0.8V. Or, during the process that the power adapter transmits an instruction to the mobile terminal 600, a maximum value of the high level of the clock signal used between the power adapter and the mobile terminal 600 is 4.5V. Or, during the process that the power adapter transmits an instruction to the mobile terminal 600, a maximum value of low level of the clock signal used between the power adapter and the mobile terminal 600 is 0.15VDD. The VDD is a work voltage of the power adapter, and/or the VDD is greater than 3.2V and less than 4.5V.

FIG. 7 is a diagrammatic view of a power adapter in accordance with an embodiment of the present disclosure. A power adapter 700 of FIG. 7 is coupled to a mobile terminal via a USB interface. Power lines of the USB interface are used for the power adapter 700 to charge a battery of the mobile terminal. Data lines of the USB interface are used for communication between the power adapter 700 and the mobile terminal. The power adapter 700 supports a normal charging mode and a quick charging mode. A charging speed of the quick charging mode is greater than that of the normal charging mode. The power adapter 700 includes a communication control circuit 710 and a charging circuit 720.

The communication control circuit 710 is configured to receive a fifth instruction from the mobile terminal when the mobile terminal determines that the power adapter 700 is a non-USB power adapter, and activates quick charging communication between the power adapter 700 and the mobile terminal, and the first instruction requests the power adapter 700 to charge the battery in the quick charging mode. The communication control circuit 710 is further configured to communicate with the mobile terminal to determine a charging voltage of the quick charging mode, communicate with the mobile terminal to determine a charging current of the quick charging mode, and adjust an output voltage and output current of the power adapter 700 to be the charging voltage and the charging current of the quick charging mode respectively to enter a constant current phase, communicate with the mobile terminal during the constant current phase to constantly receive information of a voltage of the battery from the mobile terminal, adjust the output current according to the voltage of the battery, and charge the battery in a multi-stage constant current mode via the charging circuit 720.

In embodiments of the present disclosure, the power adapter does not increase the charging current blindly for quick charging, but negotiates with the mobile terminal via communication with the mobile terminal 600 to determine whether the quick charging mode can be adopted. The security of the quick charging process is improved.

Optionally, in an embodiment, the first instruction further indicates path impedance of the mobile terminal. The path impedance of the mobile terminal is configured for the power adapter 700 to determine whether the USB interface is in good contact, or whether impedance of a charge circuit between the power adapter 700 and the mobile terminal is abnormal.

Optionally, in an embodiment, a format of the first instruction is 101000YYYYY0, Y indicates 1 bit, and the path impedance of the mobile terminal equals to YYYYY*5 mΩ.

Optionally, in an embodiment, the communication control circuit 710 is further configured to transmit a reply instruction of the first instruction to the mobile terminal, and the reply instruction of the first instruction indicates that the power adapter 700 supports the quick charging mode, or indicates that the power adapter 700 agrees to charge the battery in the quick charging mode.

Optionally, in an embodiment, a format of the reply instruction of the first instruction is 101XX, X indicates 1 bit, XX=01 indicates that the power adapter 700 has received the first instruction, and when XX is any value except 01, it indicates that the communication between the mobile terminal 600 and the power adapter becomes abnormal.

Optionally, in an embodiment, the communication control circuit 710 is configured to receive a second instruction from the mobile terminal, and the second instruction indicates that the output voltage of the power adapter is high, low, or proper. The communication control circuit 710 is configured to transmit a reply instruction of the second instruction to the mobile terminal, and the reply instruction of the second instruction indicates that the power adapter 700 has received the second instruction.

Optionally, in an embodiment, a format of the second instruction is 101001000YY0, Y indicates 1 bit, YY=11 indicates that the output voltage of the power adapter 700 is proper, YY=10 indicates that the output voltage of the power adapter 700 is high, YY=01 indicates that the output voltage of the power adapter 700 is low, and YY=00 indicates that the communication between the mobile terminal and the power adapter 700 becomes abnormal.

Optionally, in an embodiment, a format of the reply instruction of the second instruction is 101XX, X indicates 1 bit, XX=01 indicates that the power adapter has received the second instruction, and when XX is any value except 01, it indicates that the communication between the mobile terminal and the power adapter 700 becomes abnormal.

Optionally, in an embodiment, the communication control circuit 710 is configured to receive a third instruction from the mobile terminal, and the third instruction indicates a maximum charging current currently supported by the mobile terminal. The communication control circuit 710 is configured to transmit a reply instruction of the third instruction to the mobile terminal, and the reply instruction of the third instruction indicates that the power adapter 700 has received the third instruction, or the third instruction indicates that the mobile terminal is ready to enter the constant current phase.

Optionally, in an embodiment, a format of the third instruction is 101010YYY000, and Y indicates 1 bit. The maximum charging current which is currently supported by the mobile terminal equals to 3000+(YYY*250) mA.

Optionally, in an embodiment, a format of the reply instruction of the third instruction is 101XX, X indicates 1 bit, XX=01 indicates that the power adapter 700 has received the third instruction, and when XX is any value except 01, it indicates that the communication between the mobile terminal and the power adapter 700 become abnormal.

Optionally, in an embodiment, the communication control circuit 710 is configured to constantly receive a fourth instruction from the mobile terminal, and the fourth instruction indicates the voltage of the battery. The communication control circuit 710 is configured to transmit a reply instruction of the fourth instruction to the mobile terminal, and the reply instruction of the fourth instruction indicates that the power adapter 700 has received the fourth instruction.

Optionally, in an embodiment, a format of the fourth instruction is 101011YYYYYY, and Y indicates 1 bit. The voltage of the battery equals 3404+(YYYYYY*16) mV.

Optionally, in an embodiment, the reply instruction of the fourth instruction further indicates that the USB interface is in bad contact, or indicates that the impedance of the charge circuit between the power adapter 700 and the mobile terminal is abnormal, and is ready to exit the quick charging mode, or indicates that the quick charging communication process needs to be reactivated.

Optionally, in an embodiment, a format of the reply instruction of the fourth instruction is 101XX, X indicates 1 bit, XX=01 indicates that the power adapter 700 has received the fourth instruction, XX=11 indicates that the USB interface is in bad contact, or indicates that the impedance of the charge circuit between the power adapter 700 and the mobile terminal is abnormal, and is ready to exit the quick charging mode, or indicates that the quick charging communication process needs to be reactivated, and when XX is any value except 01 and 11, it indicates that the communication between mobile terminal and the power adapter 700 becomes abnormal.

Optionally, in an embodiment, the communication control circuit 710 is further configured to receive a fifth instruction from the mobile terminal, and the fifth instruction indicates a maximum voltage of the battery. The communication control circuit 710 is further configured to transmit a reply instruction of the fifth instruction to the mobile terminal, and the reply instruction of the fifth instruction indicates that the power adapter 700 has received the fifth instruction.

Optionally, in an embodiment, a format of the fifth instruction is 101100YYYYYY, and Y indicates 1 bit. The maximum voltage of the battery is 4100+YYYYYY*10 mV.

Optionally, in an embodiment, a format of the reply instruction of the fifth instruction is 101XX, X indicates 1 bit, XX=01 indicates that the power adapter 700 has received the fifth instruction, and when XX is any value except 01, it indicates that the communication between the mobile terminal and the power adapter 700 becomes abnormal.

Optionally, in an embodiment, the communication control circuit 710 is further configured to execute at least one of following operations when the communication between the power adapter 700 and the mobile terminal becomes abnormal, and the following operations include: exiting the quick charging mode, charging the battery in the normal charging mode, stopping charging, or reactivating the quick charging communication process.

Optionally, in an embodiment, an instruction transmitted from the mobile terminal to the power adapter 700 includes multiple bits. When the power adapter 700 receives any instruction, the power adapter 700 firstly receives a MSB of the multiple bits of the any instruction. Or, an instruction transmitted from the power adapter 700 to the mobile terminal includes multiple bits. When the power adapter 700 transmits a certain instruction, the power adapter 700 firstly transmits a MSB of the multiple bits of the certain instruction.

Optionally, in an embodiment, clock signals used in the communication between the power adapter 700 and the mobile terminal are provided by the power adapter 700.

Optionally, in an embodiment, an instruction transmitted from the power adapter 700 to the mobile terminal includes multiple bits. During a process of transmitting each of the multiple bits, the power adapter 700 firstly transmits each bit, and then transmits a clock interrupt signal. Or, a reply instruction received from the mobile terminal by the power adapter 700 includes multiple bits. During a process of receiving each of the multiple bits, the power adapter 700 firstly transmits the clock interrupt signal, and then receives each bit after a preset time interval.

Optionally, in an embodiment, each instruction received from the mobile terminal by the power adapter 700 includes a 12-bit data. The power adapter 700 receives the 12-bit data from the mobile terminal 600 via twelve continuous clock periods of the clock signal. Level of previous 500 μs of each of the twelve continuous clock periods is high, and level of latter 10 μs of each of the twelve continuous clock periods is low. Or, each reply instruction transmitted from the power adapter 700 to the mobile terminal includes a 5-bit data. The power adapter 700 transmits the 5-bit data to the mobile terminal via five continuous clock periods of the clock signal. Level of previous 10 μs of each of the five continuous clock periods is low, and level of latter 500 μs of each of the five continuous clock periods is high.

Optionally, in an embodiment, during a process that the power adapter 700 receives an instruction from the mobile terminal, a minimum value of high level of the clock signal used between the power adapter 700 and the mobile terminal equals to VDD of the power adapter minus 0.7V. Or, during the process that the power adapter 700 receives an instruction from the mobile terminal, a maximum value of low level of the clock signal used between the power adapter 700 and the mobile terminal is 0.8V. Or, during a process that the power adapter 700 transmits an instruction to the mobile terminal, a minimum value of high level of the clock signal used between the power adapter 700 and the mobile terminal equals to 0.25VDD+0.8V. Or, during the process that the power adapter 700 transmits an instruction to the mobile terminal, a maximum value of the high level of the clock signal used between the power adapter 700 and the mobile terminal is 4.5V. Or, during the process that the power adapter 700 transmits an instruction to the mobile terminal, a maximum value of low level of the clock signal is 0.15VDD. The VDD is a work voltage of the power adapter, and/or the VDD is greater than 3.2V and less than 4.5V.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A quick charging method applied in a mobile terminal, the mobile terminal being coupled to a power adapter via a universal serial bus (USB) interface, power lines of the USB interface being used for charging a battery of the mobile terminal, data lines of the USB interface being used for communication between the mobile terminal and the power adapter, the mobile terminal supporting a normal charging mode and a quick charging mode, a charging speed of the quick charging mode being greater than that of the normal charging mode, the method comprising:

determining, by the mobile terminal, a type of the power adapter when it is detected that the power adapter is coupled to the mobile terminal;

determining, by the mobile terminal, whether the current status of the mobile terminal satisfies a quick charging condition;

activating, by the mobile terminal, a quick charging communication process between the mobile terminal and the power adapter when it is determined that the power adapter is not a computer and that the current status of the mobile terminal satisfies the quick charging condition, and transmitting, by the mobile terminal, a first instruction to the power adapter, wherein the first instruction requests the power adapter to charge the battery in the quick charging mode;

transmitting, by the mobile terminal, a second instruction to the power adapter to determine a charging voltage of the quick charging mode, wherein the second instruction indicates whether the output voltage of the power adapter is proper;

communicating, by the mobile terminal, with the power adapter to determine a charging current of the quick charging mode; and communicating, by the mobile terminal, with the power adapter to constantly transmit information of a current voltage of the battery to the power adapter, after the power adapter adjusts an output voltage and output current of the power adapter to be the charging voltage and the charging current of the quick charging mode respectively and enters a constant current phase, wherein in the constant current phase, the power adapter is configured to adjust the output current according to the voltage of the battery, and charge the battery in a multi-stage constant current mode, wherein in the multi-stage constant current mode, multiple constant current charging stages corresponding to different constant charging currents are conducted successively.

2. The method of claim 1, wherein each instruction received from the mobile terminal by the power adapter comprises a 12-bit data, the power adapter receives the 12-bit data from the mobile terminal via twelve continuous clock periods of the clock signal, a level of previous 500 μs of each of the twelve continuous clock periods is high, and a level of latter 10 μs of each of the twelve continuous clock periods is low; or each instruction transmitted from the power adapter to the mobile terminal comprises a 5-bit data, the power adapter transmits the 5-bit data to the mobile terminal via five continuous clock periods of the clock signal, the level of previous 10 μs of each of the five continuous clock periods is low, and the level of latter 500 μs of each of the five continuous clock periods is high.

3. The method of claim 1, wherein an instruction transmitted from the power adapter to the mobile terminal comprises multiple bits, during a process of transmitting each of the multiple bits, the power adapter firstly transmits each bit by a D− data line, and then transmits a clock interrupt signal by a D+ data line; or a reply instruction received from the mobile terminal by the power adapter comprises multiple bits, during the process of receiving each of the multiple bits, the power adapter firstly transmits the clock interrupt signal by the D+ data line, and then receives each bit after a preset time interval by the D− data line.

4. The method of claim 3, further comprising:

receiving, by the mobile terminal, a reply instruction of the first instruction from the power adapter, wherein the reply instruction of the first instruction indicates that the power adapter supports the quick charging mode, or indicates that the power adapter agrees to charge the battery in the quick charging mode; and wherein communicating, by the mobile terminal, with the power adapter to determine the charging current of the quick charging mode further comprises:

transmitting, by the mobile terminal, a third instruction to the power adapter, wherein the third instruction indicates a maximum charging current currently supported by the mobile terminal;

receiving, by the mobile terminal, a reply instruction of the third instruction from the power adapter, wherein the reply instruction of the third instruction indicates that the power adapter has received the third instruction, or the third instruction indicates that the mobile terminal is ready to enter the constant current phase;

communicating, by the mobile terminal, with the power adapter to constantly transmit the information of the voltage of the battery to the power adapter further comprises:

transmitting, by the mobile terminal, a fourth instruction to the power adapter, wherein the fourth instruction indicates the voltage of the battery; and receiving, by the mobile terminal, a reply instruction of the fourth instruction from the power adapter, wherein the reply instruction of the fourth instruction indicates that the power adapter has received the fourth instruction.

5. A mobile terminal, the mobile terminal being coupled to a power adapter via a universal serial bus (USB) interface, power lines of the USB interface being used for charging a battery of the mobile terminal, data lines of the USB interface being used for communication between the mobile terminal and the power adapter, the mobile terminal supporting a normal charging mode and a quick charging mode, a charging speed of the quick charging mode being greater than that of the normal charging mode, the mobile terminal comprising:

a charging circuit; and a communication control circuit configured to determine a type of the power adapter when it is detected that the power adapter is coupled to the mobile terminal, determine whether the current status of the mobile terminal satisfies a quick charging condition, activate a quick charging communication process between the mobile terminal and the power adapter when it is determined that the power adapter is not a computer and that the current status of the mobile terminal satisfies the quick charging condition, and transmit a first instruction to the power adapter, wherein the first instruction requests the power adapter to charge the battery in the quick charging mode, the communication control circuit is further configured to transmit a second instruction to the power adapter to determine a charging voltage of the quick charging mode, wherein the second instruction indicates whether the output voltage of the power adapter is proper, communicate with the power adapter to determine a charging current of the quick charging mode, and communicate with the power adapter to constantly transmit information of a current voltage of the battery to the power adapter, when the power adapter adjusts an output voltage and output current of the power adapter to be the charging voltage and the charging current of the quick charging mode respectively and enters a constant current phase, wherein in the constant current phase, the power adapter is configured to adjust the output current according to the voltage of the battery, and charge the battery in a multi-stage constant current mode via the charging circuit, wherein in the multi-stage constant current mode, multiple constant current charging stages corresponding to different constant charging currents are conducted successively.

6. The mobile terminal of claim 5, wherein each instruction received from the mobile terminal by the power adapter comprises a 12-bit data, the power adapter receives the 12-bit data from the mobile terminal via twelve continuous clock periods of the clock signal, a level of previous 500 μs of each of the twelve continuous clock periods is high, and a level of latter 10 μs of each of the twelve continuous clock periods is low; or each reply instruction transmitted from the power adapter to the mobile terminal comprises a 5-bit data, the power adapter transmits the 5-bit data to the mobile terminal via five continuous clock periods of the clock signal, the level of previous 10 μs of each of the five continuous clock periods is low, and the level of latter 500 μs of each of the five continuous clock periods is high.

7. The mobile terminal of claim 6, wherein the communication control circuit is configured to constantly transmit a fourth instruction to the power adapter, and the fourth instruction indicates the voltage of the battery, the communication control circuit is configured to receive a reply instruction of the fourth instruction from the power adapter, and the reply instruction of the fourth instruction indicates that the power adapter has received the fourth instruction.

8. The mobile terminal of claim 6, wherein:

during a process that the power adapter receives an instruction from the mobile terminal, a minimum value of a high level of a clock signal used between the power adapter and the mobile terminal equals to VDD of the power adapter minus 0.7V; or during the process that the power adapter receives the instruction from the mobile terminal, a maximum value of a low level of the clock signal used between the power adapter and the mobile terminal is 0.8V; or during the process that the power adapter transmits the instruction to the mobile terminal, a minimum value of the high level of the clock signal used between the power adapter and the mobile terminal equals to 0.25VDD+0.8V; or during the process that the power adapter transmits the instruction to the mobile terminal, a maximum value of the high level of the clock signal used between the power adapter and the mobile terminal is 4.5V; or during the process that the power adapter transmits the instruction to the mobile terminal, a maximum value of the low level of the clock signal is 0.15VDD; and wherein:

the VDD is a work voltage of the power adapter, and/or the VDD is greater than 3.2V and less than 4.5V.

9. The mobile terminal of claim 6, wherein the first instruction further indicates path impedance of the mobile terminal, and the path impedance of the mobile terminal is configured for the power adapter to determine whether the USB interface is in good contact, or whether impedance of a charge circuit between the power adapter and the mobile terminal is abnormal.

10. The mobile terminal of claim 6, wherein the communication control circuit is further configured to receive a reply instruction of the first instruction from the power adapter, and the reply instruction of the first instruction indicates that the power adapter supports the quick charging mode, or indicates that the power adapter agrees to charge the battery in the quick charging mode.

11. The mobile terminal of claim 6, wherein the communication control circuit is configured to transmit a third instruction to the power adapter, and the third instruction indicates a maximum charging current currently supported by the mobile terminal, the communication control circuit is configured to receive a reply instruction of the third instruction from the power adapter, and the reply instruction of the third instruction indicates that the power adapter has received the third instruction, or the third instruction indicates that the mobile terminal is ready to enter the constant current phase.

12. The mobile terminal of claim 5, wherein an instruction transmitted from the power adapter to the mobile terminal comprises multiple bits, during a process of transmitting each of the multiple bits, the power adapter firstly transmits each bit by a D− data line, and then transmits a clock interrupt signal by a D+ data line; or a reply instruction received from the mobile terminal by the power adapter comprises the multiple bits, during the process of receiving each of the multiple bits, the power adapter firstly transmits the clock interrupt signal by the D+ data line, and then receives each bit after a preset time interval by the D− data line.

13. The mobile terminal of claim 12, wherein the communication control circuit is further configured to receive a reply instruction of the first instruction from the power adapter, and the reply instruction of the first instruction indicates that the power adapter supports the quick charging mode, or indicates that the power adapter agrees to charge the battery in the quick charging mode; and the communication control circuit is further configured to transmit a third instruction to the power adapter, and the third instruction indicates a maximum charging current currently supported by the mobile terminal, the communication control circuit is further configured to receive a reply instruction of the third instruction from the power adapter, and the reply instruction of the third instruction indicates that the power adapter has received the third instruction, or the third instruction indicates that the mobile terminal is ready to enter the constant current phase.

14. The mobile terminal of claim 12, wherein the communication control circuit is configured to constantly transmit a fourth instruction to the power adapter, and the fourth instruction indicates the voltage of the battery, the communication control circuit is configured to receive a reply instruction of the fourth instruction from the power adapter, and the reply instruction of the fourth instruction indicates that the power adapter has received the other instruction.

15. A power adapter, the power adapter being coupled to a mobile terminal via a universal serial bus (USB) interface, power lines of the USB interface being used for the power adapter to charge a battery of the mobile terminal, data lines of the USB interface being used for communication between the power adapter and the mobile terminal, the power adapter supporting a normal charging mode and a quick charging mode, a charging speed of the quick charging mode being greater than that of the normal charging mode, the power adapter comprising:

a charging circuit; and a communication control circuit configured to receive a first instruction from the mobile terminal when the mobile terminal determines that the power adapter is not a computer and that the current status of the mobile terminal satisfies a quick charging condition, and activates a quick charging communication process between the mobile terminal and the power adapter, wherein the first instruction requests the power adapter to charge the battery in the quick charging mode, the communication control circuit is further configured to receive a second instruction from the mobile terminal to determine a charging voltage of the quick charging mode, and the second instruction indicates whether the output voltage of the power adapter is proper, communicate with the mobile terminal to determine a charging current of the quick charging mode, adjust an output voltage and output current of the power adapter to be the charging voltage and the charging current of the quick charging mode respectively to enter a constant current phase, communicate with the mobile terminal during the constant current phase to constantly receive information of a current voltage of the battery from the mobile terminal, and adjust the output current according to the voltage of the battery, so as to charge the battery in a multi-stage constant current mode via the charging circuit, wherein in the multi-stage constant current mode, multiple constant current charging stages corresponding to different constant charging currents are conducted successively.

16. The power adapter of claim 15, wherein each instruction received from the mobile terminal by the power adapter comprises a 12-bit data, the power adapter receives the 12-bit data from the mobile terminal via twelve continuous clock periods of the clock signal, a level of previous 500 μs of each of the twelve continuous clock periods is high, and a level of latter 10 μs of each of the twelve continuous clock periods is low; or each reply instruction transmitted from the power adapter to the mobile terminal comprises a 5-bit data, the power adapter transmits the 5-bit data to the mobile terminal via five continuous clock periods of the clock signal, the level of previous 10 μs of each of the five continuous clock periods is low, and the level of latter 500 μs of each of the five continuous clock periods is high.

17. The power adapter of claim 16, wherein the first instruction further indicates path impedance of the mobile terminal, and the path impedance of the mobile terminal is configured for the power adapter to determine whether the USB interface is in good contact, or whether impedance of a charge circuit between the power adapter and the mobile terminal is abnormal.

18. The power adapter of claim 16, wherein the communication control circuit is further configured to transmit a reply instruction of the first instruction to the mobile terminal, and the reply instruction of the first instruction indicates that the power adapter supports the quick charging mode, or indicates that the power adapter agrees to charge the battery in the quick charging mode.

19. The power adapter of claim 16, wherein the communication control circuit is configured to receive a third instruction from the mobile terminal, and the third instruction indicates a maximum charging current currently supported by the mobile terminal, and the communication control circuit is configured to transmit a reply instruction of the third instruction to the mobile terminal, and the reply instruction of the third instruction indicates that the power adapter has received the third instruction, or the third instruction indicates that the mobile terminal is ready to enter the constant current phase.

20. The power adapter of claim 15, wherein an instruction transmitted from the power adapter to the mobile terminal comprises multiple bits, during a process of transmitting each of the multiple bits, the power adapter firstly transmits each bit by a D− data line, and then transmits a clock interrupt signal by a D+ data line; or a reply instruction received from the mobile terminal by the power adapter comprises the multiple bits, during the process of receiving each of the multiple bits, the power adapter firstly transmits the clock interrupt signal by the D+ data line, and then receives each bit after a preset time interval by the D− data line.

21. The power adapter of claim 20, wherein the communication control circuit is further configured to receive a reply instruction of the first instruction from the mobile terminal, and the reply instruction of the first instruction indicates that the power adapter supports the quick charging mode, or indicates that the power adapter agrees to charge the battery in the quick charging mode.

* * * * *